(12) United States Patent
Ruuska et al.

(10) Patent No.: US 7,680,520 B2
(45) Date of Patent: Mar. 16, 2010

(54) CONNECTION MODE FOR LOW-END RADIO

(75) Inventors: Päivi M. Ruuska, Tampere (FI); Antti Lappeteläinen, Espoo (FI); Jukka Reunamäki, Tampere (FI); Juha Salokannel, Kangasala (FI)

(73) Assignee: Nokia Corporation, Espoo (FI)

( * ) Notice: Subject to any disclaimer, the term of this patent is extended or adjusted under 35 U.S.C. 154(b) by 1390 days.

(21) Appl. No.: 10/797,205

(22) Filed: Mar. 9, 2004

(65) Prior Publication Data
US 2005/0020322 A1 Jan. 27, 2005

Related U.S. Application Data

(63) Continuation-in-part of application No. 10/610,990, filed on Jun. 30, 2003, now Pat. No. 7,515,945.

(51) Int. Cl.
*H04B 1/38* (2006.01)
*H04J 3/16* (2006.01)

(52) U.S. Cl. .................... 455/574; 455/41.2; 370/311

(58) Field of Classification Search ............ 455/574, 455/41.2, 41.1, 41.3; 370/311, 449, 346, 370/503, 338
See application file for complete search history.

(56) References Cited

U.S. PATENT DOCUMENTS

| | | | |
|---|---|---|---|
| 5,571,235 A * | 11/1996 | Yano ............... 72/269 |
| 5,771,235 A | 6/1998 | Tang et al. | |
| 6,067,297 A | 5/2000 | Beach | |
| 6,807,159 B1 * | 10/2004 | Shorey et al. ........... 370/318 |
| 6,907,227 B2 | 6/2005 | Fujioka | |
| 7,193,986 B2 | 3/2007 | Scanlon et al. | |
| 2002/0037700 A1 | 3/2002 | Dooley et al. ............ 455/41 |
| 2002/0193072 A1 | 12/2002 | Alinikula et al. ......... 455/41 |
| 2002/0193073 A1 | 12/2002 | Fujioka | |
| 2003/0231607 A1 | 12/2003 | Scanlon et al. | |

FOREIGN PATENT DOCUMENTS

EP 1 107 522 A1 6/2001

(Continued)

OTHER PUBLICATIONS

EP Appln. No. 04253619.3 Communication (Dec. 3, 2004); EP Search Report (Nov. 29, 2004).

(Continued)

*Primary Examiner*—Melur Ramakrishnaiah
(74) *Attorney, Agent, or Firm*—Locke Lord Bissell & Liddell LLP

(57) ABSTRACT

The present invention relates to systems and methods for a implementing an optimized power conservation communication protocol, wherein the communication link is flexible and the power consumption characteristics are optimized. One facet of the system's flexibility relates to the system's ability to negotiate device control roles associated with a polling communication link. Also, once the device control roles are in place and the communication link is established, the system selectively implements a number of polling protocols for a multitude of applications that need a low power consumption. In some embodiments the system maintains a communication link with a reduced frequency polling protocol. This type of communication link maintains efficient power consumption characteristics, as well as, connection times that are faster than establishing a communication link between disconnected devices.

39 Claims, 17 Drawing Sheets

FOREIGN PATENT DOCUMENTS

| | | |
|---|---|---|
| GB | 2 379 365 A | 7/2002 |
| WO | WO 02/25879 A1 | 3/2002 |
| WO | WO 02/052793 A1 | 7/2002 |

OTHER PUBLICATIONS

EP Appln. No. 04253082.4 Communication (Nov. 15, 2004); EP Search Report (Nov. 3, 2004).

Balakrishna J. Prabhu et al., "A Routing Protocol and Energy Efficient Techniques in Bluetooth Scatternets", Dept. of Electrical Communication Engineering, Indian Institute of Science, Bangalore 560012, India, 2002 IEEE, pp. 3336-3340.

EPO Communication, Nov. 27, 2006 (6 pgs.).

* cited by examiner

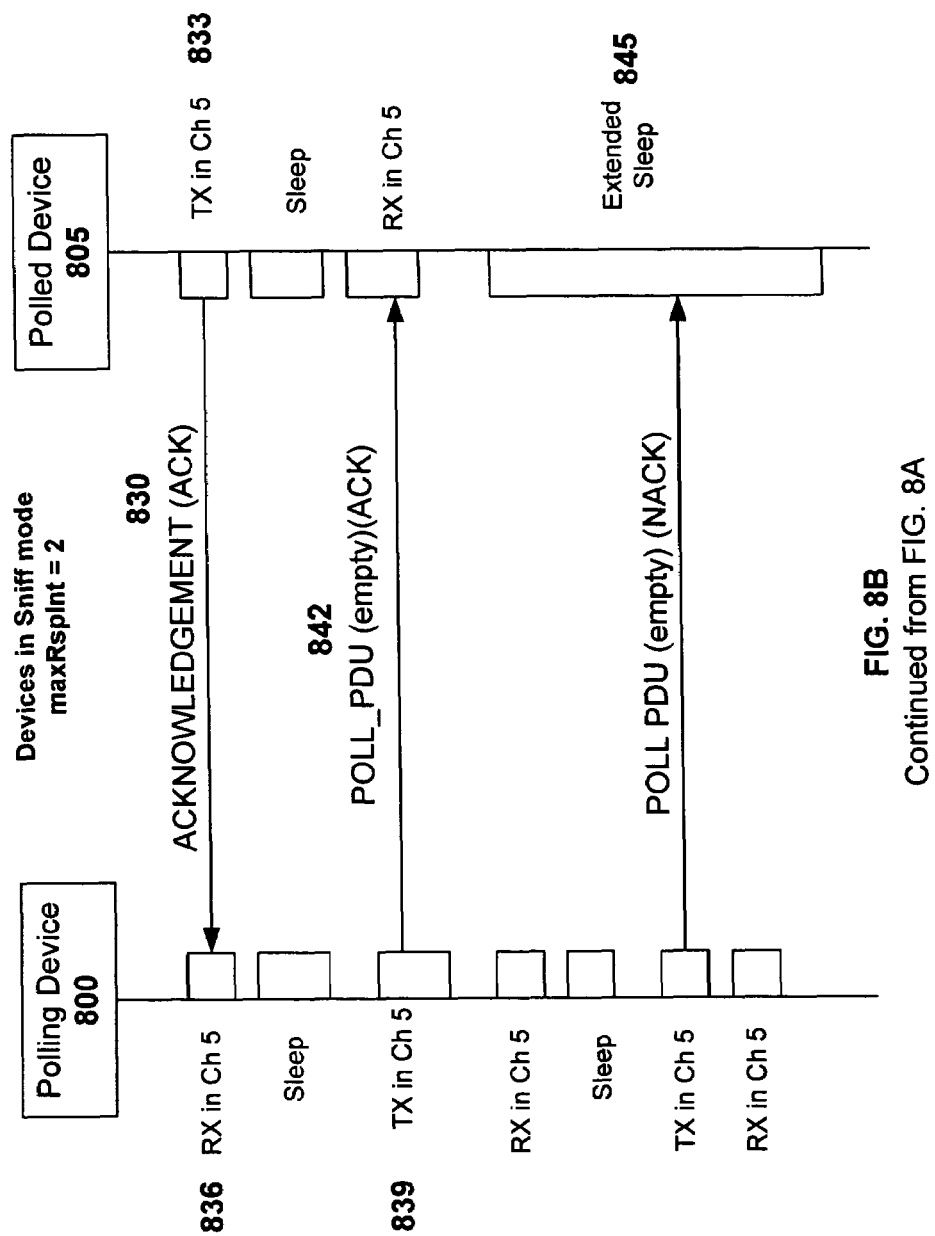
FIG. 8B
Continued from FIG. 8A

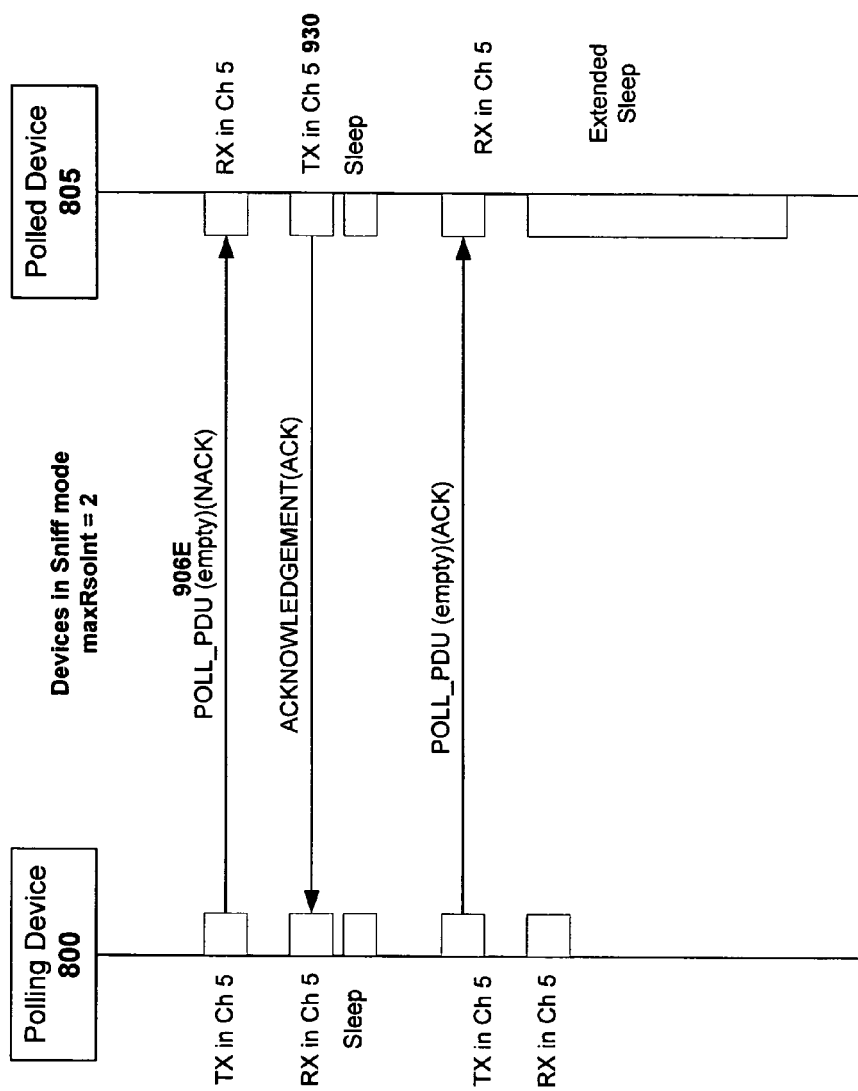
FIG. 9B
Continued from FIG. 9A

CONNECTION MODE FOR LOW-END RADIO

RELATED APPLICATION

This application is a continuation-in-part of our co-pending application Ser. No. 10/610,990, filed Jun. 30, 2003 and entitled "Connected Mode in Low-End Radio."

FIELD OF INVENTION

This invention relates generally to establishing a short-range wireless communication link between two or more wireless devices and, more particularly, to methods and apparatus for implementing a communication protocol with optimized power consumption characteristics for communicating with a variety of devices.

BACKGROUND INFORMATION

There are a wide range of systems for establishing and maintaining short range wireless communication links. Many of these systems require a line of sight link, do not support two way communication, do not provide low power consumption characteristics, or flexible connection topologies. Two examples of short range wireless communication protocols are Bluetooth and low-end radio.

As the Bluetooth specification matures, there are a greater number of wireless devices implementing Bluetooth as a standard feature. However, the power consumption requirements and implementation costs make it prohibitive to implement in a host of wireless devices that have low power capacity. Nokia Research Center has developed a radio technology, called low-end radio, which is based on the Bluetooth Specification and may utilize at least the analog parts of the Bluetooth radio, to provide wireless communication links between devices that have limited power resources. The low-end radio protocol enables significant power and cost reductions over Bluetooth wireless devices and accommodates devices having limited power resources.

Low-end radio is discussed in International Publication Number WO 02/073893. The low-end radio protocol enables devices with low power consumption requirements to communicate wirelessly over a certain frequency band. Unlike Bluetooth, low-end radio does not implement a frequency hopping routine or a transmission slot system. This results in a simpler, less complex system than a standard Bluetooth implementation. The low-end radio protocol divides the communication frequency band into a multitude of communication channels.

A device with low-end radio protocol provides more efficient power savings when compared with the standard Bluetooth devices. However, additional power savings would enable low-end radio applications to become even more diverse and widespread. One possible method for reducing power consumption involves implementing low-end radio with Carrier Sensing Multiple Access and collision avoidance.

U.S. patent application Ser. No. 10/224,768, entitled "Carrier Sensing Multiple Access with Collision Avoidance Scheme Optimized For A Priori Known Carrier Usage For Low Duty Systems," (CSMA with collision avoidance) describes systems and methods for a communication system implementing a short range wireless communication link between user devices. The communication system provides a low power solution utilizing an optimized combination of carrier sensing and frequency division multiple access to avoid collisions. The optimization described in that patent application implements a random mean zero value offset appended to a device's transmission frames, when transmissions are sensed on a transmission channel. The offset increases the probability that a first advertising device will recognize another device's transmissions (i.e., determine that a channel is busy) and avoid simultaneous transmissions that result in transmission collisions. Upon recognizing another device's transmissions, the first device may shift its transmission frame to avoid transmission collisions between devices. Consequently, through efficient management of device transmissions, fewer retransmissions are necessary and power consumption is reduced. The carrier sensing communication links may be implemented in either a StandAlone LowRate system, or in a device with a pre-existing Bluetooth implementation.

The Bluetooth specification also has a low-power operating mode that attempts to minimize power consumption. A Bluetooth piconet includes a master and anywhere from one to seven active slaves communicating. Bluetooth implements a frequency hopping system derived from the master's Bluetooth clock signal and the device address. Generally, the hop rate in a normal connection is 1600 hops/s. Transmissions are conducted during specified time slots that are determined according to a predetermined hopping scheme, (e.g., the duration of a time slot is 625 μs). According to the Bluetooth protocol, a Master device may start transmitting only in even-numbered slots, whereas the slave devices may transmit in odd-numbered slots. The data packets may occupy 1, 3 or 5 slots. The whole packet is always transmitted in the same channel. The master polls one slave at the time. Each slave transmits a response message back to the master after receiving the poll. The active slave devices recognize their packets by processing a 3-bit active member addresses in the packet header. Further interaction between a master and a slave depends upon which of three types of master/slave communication links is established.

There are three different communication link types that a master and active slaves in the Bluetooth low power mode may establish: Synchronous Connection-Oriented (SCO) link, Extended Synchronous Connection-Oriented (eSCO) link, and Asynchronous Connection-Less (ACL) link. Synchronous links establish point-to-point links between a master and a single slave in the piconet. A master can manage up to three SCO links by using reserved slots at regular intervals. In SCO links, packets are never retransmitted, whereas eSCO links may have an additional retransmission window after the reserved transmission slots. An ACL link may be a point-to-multi-point link between a master and all of the slaves participating on the piconet. A master can establish an ACL link on a per-slot basis to any slave, in transmission slots not reserved for the synchronous links.

The Bluetooth ACL link implements a system where slaves may enter a sleep state for a predetermined length of time. For example, the Bluetooth protocol implements a low power mode (sniff mode) for slaves which participate on ACL links. Sniff mode reduces the number of the time slots in which the master can start transmission to a specific slave. The master can start transmission only in specified time slots, called sniff slots, which are spaced regularly within a time interval ($T_{sniff}$) . The slave in sniff mode starts listening for sniff slots after a predetermined delay ($D_{sniff}$).

Fifteen packet types are defined for data links, for different link types, data, error handling and length. Additionally, there are 5 common packets for control purposes and connection establishment. Each synchronous (voice) channel supports a 64 kb/s data rate in each direction, whereas the asynchronous channel can support a maximum data rate of 723.2 kb/s asymmetric (and still up to 57.6 kb/s in the return direction), or 433.9 kb/s symmetric.

Despite the improved power consumption characteristics associated with implementing low-end radio and Bluetooth's low power mode in coordination with CSMA with collision avoidance, these protocols do not satisfy the power requirements of a multitude of wireless devices and applications with low power requirements.

SUMMARY OF THE INVENTION

The invention is directed to a low power optimized implementation of a communication protocol between at least two wireless devices that may have low power consumption requirements. The communication devices may implement a polling communication protocol between polling and polled devices. The polling communication protocol involves a polling device transmitting a message to a polled device. The polled device may, in turn, respond only to the message transmitted from the polling device. Specifically, a polling device and a polled device are provided with the option of switching or swapping polling roles. Depending on the application, polling role switching may be executed as the devices establish a communication link. Polling role switching—the ability of the devices to shift the polling device role to a user/advertising device that is less sensitive to power consumption requirements—results in a greater level flexibility, as well as decreased power consumption in the device assuming the polled device role after role switching, when used with an asymmetrical low activity mode.

A second optimization involves a communication device entering an asymmetrical low activity mode, wherein a polled device may selectively determine not to receive and respond to every polling request (e.g., a polling device transmits three polling messages, but the polled device may respond just to the third polling request, and ignore the other two polling requests). An additional aspect of the asymmetrical low activity mode is the ability of the polling device to selectively refrain from transmitting polling messages. For example, a polled device may be set to ignore a selected number of polling messages, yet the polling device may be configured either to continue transmitting polling messages as it normally would or to refrain from transmitting a number of polling messages (at least some of which would be ignored by the polled device) and then revert to transmitting subsequent polling messages according to the previous polling message frequency. The reduction in the volume of polled device listening for polling messages and sending message response transmissions correlates to a reduction in the polled device power consumption. Similarly, a reduction in the number of polling messages transmitted from the polling device corresponds to a reduction in the polling device power consumption.

The actual implementation of the asymmetrical low activity mode in the polling device may vary depending on application specific characteristics. Some exemplary characteristics include power characteristics of the polling/polled, the need for a polling/polled device to transmit new data quickly, etc. . . . For example, the polling device may selectively determine not to transmit a polling message during certain polling periods. Specifically, a polled device listens during each poll event (a polling message/response exchange) for polling messages and responds to all received polling messages. (e.g., a polling device transmits a polling message in every third polling event, but the polled device listens in each poll event for poll requests, needlessly consuming extra power by listening for polling messages during periods of time when the polling device will not transmit polling messages). This exemplary implementation enables the polling device to save power or attend to other connections and still have fast access (maintaining an active connection) with the polled device, which is listening to the poll events according to a predetermined polling frequency.

The parameters associated with polling/polled device low activity mode are included in the request to enter low activity mode. Specifically, during a low activity request/acknowledgement, a polling/polled device determines the low activity parameters described above (e.g., durations of device low activity). In the event that the parameters are unacceptable for certain operating conditions a device may negotiate a more satisfactory set of parameters with the other device. For example, a device may determine if it possible for the other device to reduce presence (i.e., minimize the power consumed in listening for polling messages that will not be sent or refrain from sending polling messages when a polled device is not listening during a low activity mode) in the poll events, and request that the other device be active for every poll event, or a specific number of poll events, The operating environment may necessitate one of the devices to be present in each poll event, if the application requires fast access. If fast access is not as critical as power conservation both devices may reduce presence on the communication channel by establishing viable low activity parameters. If both devices reduce the presence in the poll events by the same amount, they effectively enter a symmetric low activity mode.

The foregoing optimizations facilitate either point-to-point or a point-to-multi-point communication topology for short range wireless communication devices without adding a great deal of complexity. In addition, the reduced duty cycle associated with a polled device decreases the power consumption associated with services implementing continuous bit streams. Specifically, the symmetrical low activity mode provides power consumption savings in both the polling and polled devices. Asymmetrical low activity mode provides additional power consumption savings for one of the devices over the power conserved by both devices in symmetrical low activity mode. For example, in a voice connection between a mobile phone and a wireless headset/hearing aid, the headset may implement a low power mode when the operating environment is silent for a predetermined length of time, depending on the application and operating environment. The implementation would extend the headset's battery life, especially in an operating environment where continuous data transfers are not necessary.

Other and further aspects of the invention will become apparent from the following detailed description with reference to the accompanying drawings.

BRIEF DESCRIPTION OF THE DRAWINGS

FIGS. 8A and 8B illustrate an exemplary operational flow diagram of an asymmetrical low activity (sniff) mode, wherein the polled device enters an extended sleep state based on receipt of an acknowledgement from the previous polling sequence.

FIGS. 9A and 9B illustrate an exemplary operational flow diagram of the embodiment shown in FIGS. 8A and 8B, wherein the polled device enters an extended sleep state when the polling device completes a data transfer.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Overview

The optimizations described herein are directed to reducing power consumption, while maintaining communication links between short range wireless devices. Such optimized devices may communicate using a variety of communication protocols. Preferably, one such communication protocol is optimized low-end radio. It is to be understood that the optimizations described herein, may be applied to a wide range communication protocols such as Bluetooth or low-end radio. In an exemplary Bluetooth implementation, the master/slave communication protocols may be modified in accordance with the aspects of the invention described below, wherein a master device and a slave device adopt a polling or polled device role, respectively. Generally, devices implementing optimized Bluetooth or low-end radio protocols are wireless devices that have a transmitter, a receiver, a processor, memory, and may include any number of either consumer, commercial, or industrial electronic devices.

The communications between devices implementing optimized low-end radio protocol preferably involves two packet structures: identification packets and general packets. In alternate embodiments, the communications between devices may involve other forms of wireless communication, for example analog communications. The general packets are used for data and control information. The same header structure is implemented for all general packets The payload length is variable, up to 255 bytes. An ID_INFO packet is used to establish connections between local and remote devices within a communication coverage range.

A representative embodiment of the invention described herein is an optimized low-end radio connection protocol (but of course is adaptable according to other communication protocols, as well) for establishing communications with one or more devices, and to the methods, systems, and computer media associated with implementing the optimizations. The optimized low-end radio protocol preferably comprises a system to establish a communication link optimized for low power consumption. Low-end radio (LER) devices may establish a communication link between two LER devices, wherein one LER device assumes a polling device role and the other assumes a polled device role. Advantageously, a LER enabled device is capable of assuming either polling roles.

Figure 1:
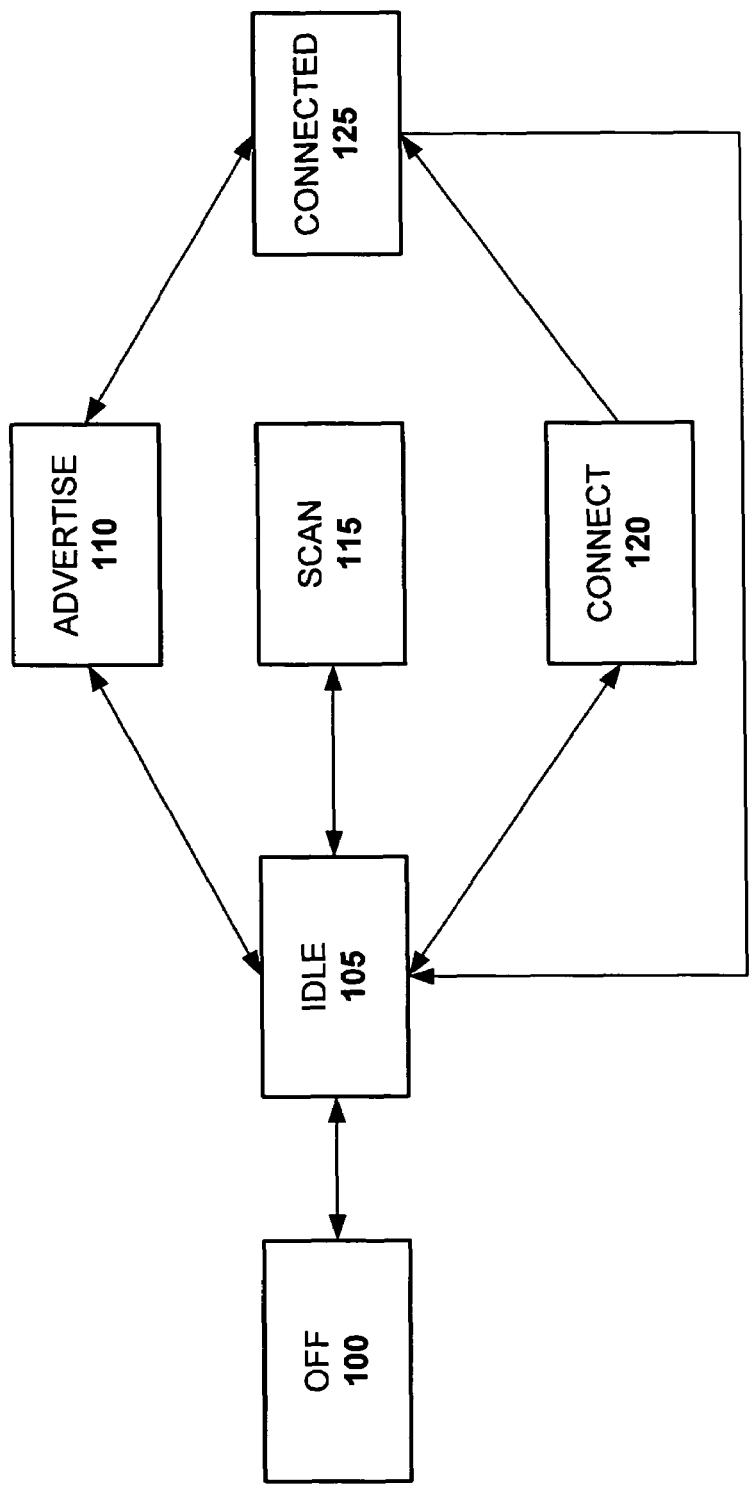
FIG. 1 is a operational mode diagram illustrating the various transitions between operational modes associated with an optimized low-end radio device.

FIG. 1 is a connectivity state diagram illustrating the operational modes of an optimized LER device. A device may initially start in the off mode 100. A user activates the device and transitions the device into the idle mode 105. Depending on the device application, the device may transition from idle mode 105 to an advertise mode 110, scan mode 115, or connect mode 120.

The local device's connectivity mode is application-dependent. The advertise mode 110 makes the local device visible to other devices within a communication coverage range. A local device in the advertise mode may be constrained to communicate with a limited subset of devices. The low-end radio protocol enables the possibility of an application-dependent tradeoff between connection set-up time and power consumption. For example, a device in advertise mode 110 consumes power and time determining whether there are any connectable devices within a coverage area. After determining, that there is at least one desirable connectable device present, the device in advertise mode consumes additional power connecting to any of the user-<specified devices. In contrast, a device in connect mode 120 attempts to connect with a specific advertising remote device and does not consume power or time determining whether there are other connectable devices within a coverage area. In scan mode 115, a local device collects addresses and short descriptions from one or more advertising remote devices within a communication coverage range.

When a local device enters the connect mode 120, the local device attempts to establish a point-to-point, bi-directional data delivery with error detection, or Admissions ReQuest message (ARQ). As illustrated in FIG. 1, a local device may, in turn, transition to the connected mode 125 from either the advertise mode or the connect mode. As the connected mode is terminated, the device will either enter the advertise mode or the idle mode. The next mode is selected by an upper layer. A local device in the connected mode 125 may selectively enter a particular operational mode (e.g., an active mode or a low activity mode). The low activity mode (low power mode) may also facilitate a switch from a point-to-point operational topology to a point to multi-point operational topology, for devices that are capable of acting as polling devices in multiple connections.

Figure 2B:
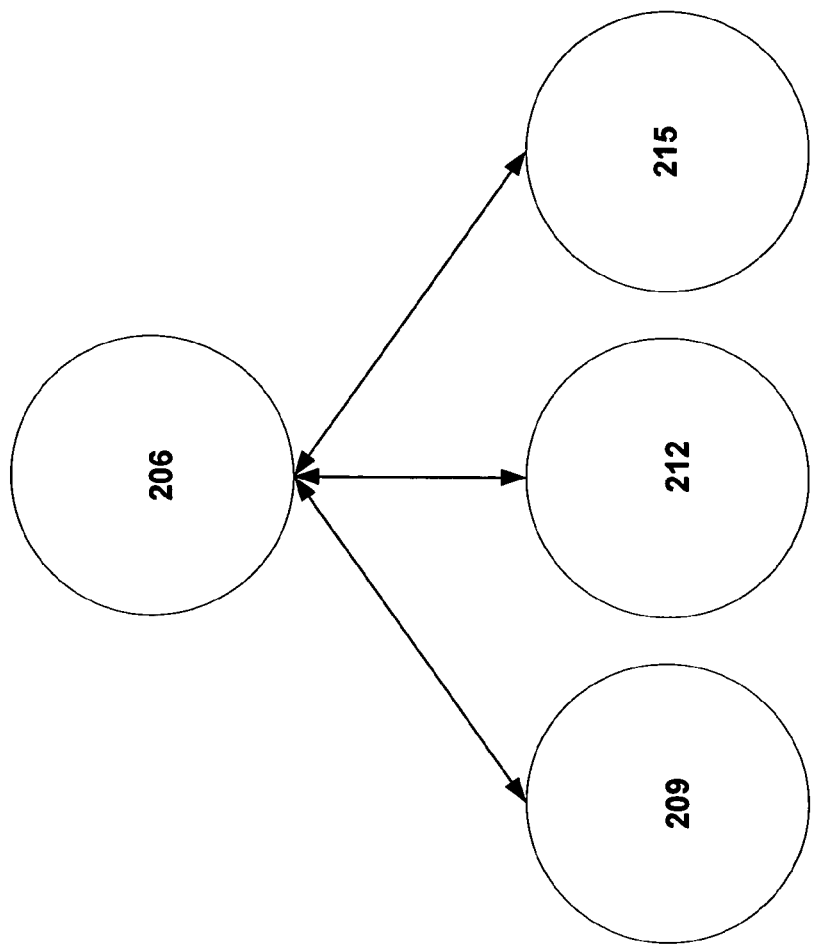
FIGS. 2A and 2B illustrate two distinct optimized low-end radio communication link topologies.
Figure 2A:
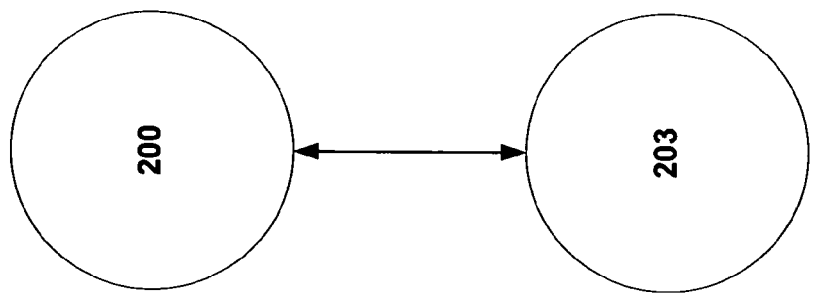

FIGS. 2A and 2B schematically illustrate local devices communicating in a point-to-point operational topology and a point-to-multi-point topology, respectively. As shown in FIG. 2A, the polling device 200 is in the connected mode 125 communicating with polled device 203 in a point-to-point topology. In FIG. 2B, polling device 206 establishes a point-to-multi-point connection topology with polled devices 209, 212, and 215. Generally, in order to facilitate communication management, devices in a point to multi-point connection may implement an asymmetrical low activity polling protocol.

In the present invention, it is to be understood that the operations and functionality illustrated in the figures are accomplished by advertising devices, that advertise data or information for subsequent data transfers, and user devices which receive and process the data or information. It is to be understood that advertising devices and user devices include transmitters, receivers, and processors that are operatively programmed to transmit, receive, and process the messages exchanged between devices, as well as execute the functionality associated with the exchanged messages as disclosed herein, with regard to the figures.

Figure 3:
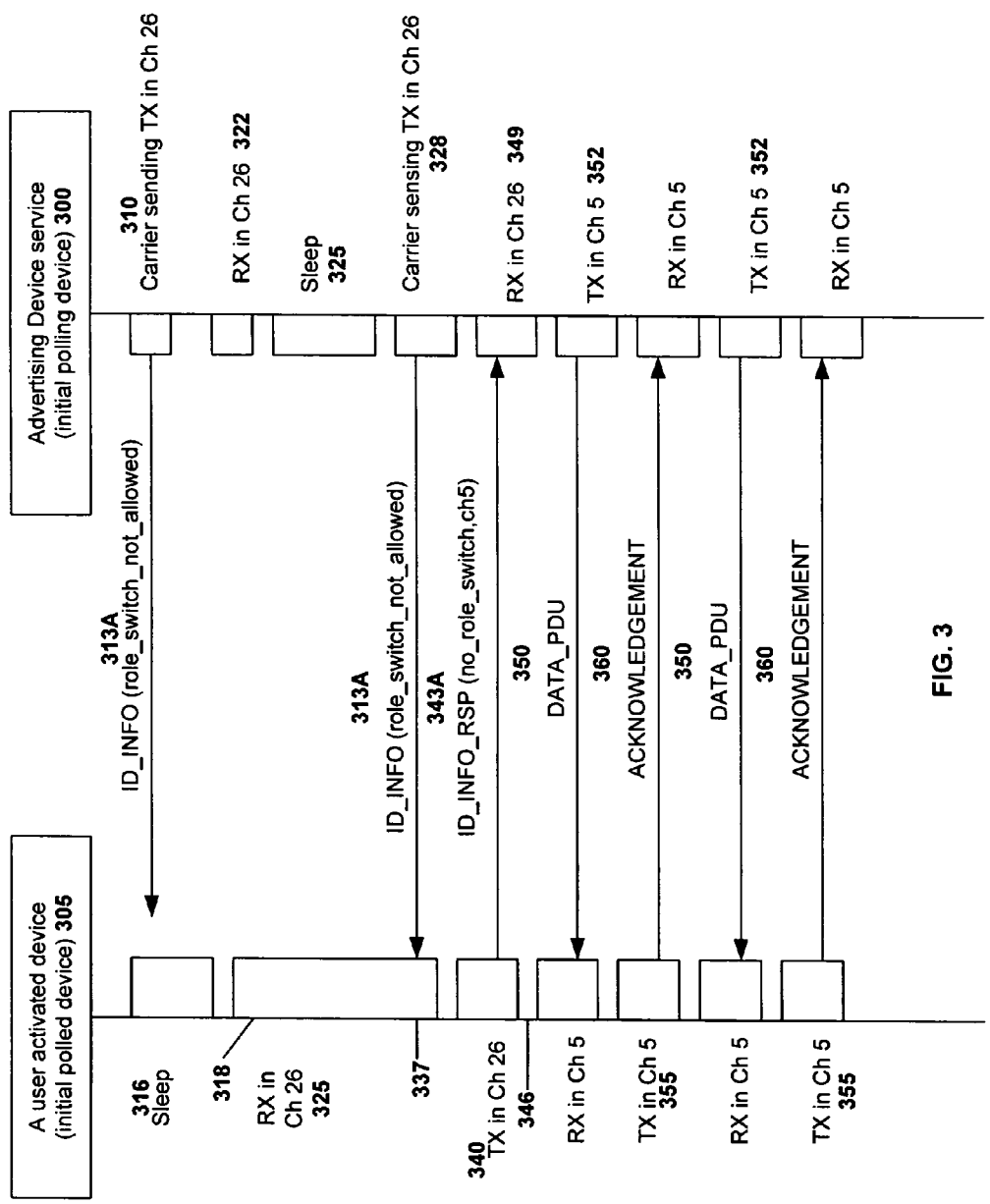
FIG. 3 is an exemplary operational flow diagram of an embodiment of the present invention, in which a polling advertising device attempts to establish a communication link with a polled user device.

For example, two LER devices communicating in a point-to-point topology are capable of negotiating device control roles as the devices establish the communication link. Specifically, to increase power consumption savings, a user device may initiate a polling device role exchange (polling role switching) is enabled, wherein the user device (initial polled device) assumes the role of the polling device and the advertising device (the initial polling device) assumes the polled device role. FIG. 3 illustrates two LER devices establishing a communication link with polling role negotiation disabled, whereas FIG. 4 illustrates the LER devices with polling role negotiation enabled.

The optimized low-end radio protocol divides the range of available communication channels into advertising channels and data transfer channels. By way of example only, a LER device in advertise mode 110 periodically broadcasts an advertising message, ID_INFO, in one of three advertising channels, such as channel 26, as the device advertises its availability to connect. The ID_INFO packet, sent by the polling device 300, contains the lower part of a 64-bit IEEE address and a service field. In turn, the service field may contain information about the device, for example: if the device allows connections to all the devices, if connection to certain devices are restricted, if users may purchase services associated with a LER device, if a particular LER device provides access to the internet, if the upper layer of the protocol stack has updated information, or if the LER device can facilitate polling role switching of connected devices as discussed below.

FIG. 3 also illustrates the operations associated with establishing a communication link between a device (polling device 300) that is advertising data or services and a user device (polled device 305). An advertising device periodically transmits a data message, ID_INFO, that may identify the type of services or information available. In the embodiment illustrated in FIG. 3, the advertising device transmits ID_INFO on a channel designated for advertising a device's availability for connection, (e.g., channel 26). If a user activated device is within communication range of the advertising device, it may respond by transmitting a response data message, ID_INFO_RSP. Some of the data elements within the ID_INFO_RSP packet may include the lower part of the 64-bit IEEE address of the polled device, the request for polling role switching, and/or the data channel to be used for any subsequent data transfers. The request for polling role switching in the ID_INFO_RSP packet is not relevant if there was a corresponding notice in the ID_INFO packet indicating that the advertising device has disabled polling role switching. If the ID_INFO packet does not indicate disabling role switching then the polling switching in the ID_INFO_RSP is relevant. However, the user device does not have to request polling role switching, if it was initially enabled by the advertising device in the ID_INFO packet.

FIG. 3 illustrates an operational flow diagram of two devices establishing a low-end radio communication link wherein polling role switching is disabled. After conducting carrier sensing on advertising channel 26 and determining the absence of conflicting transmissions (310), the polling device 300 transmits the ID_INFO packet 313A. Additionally, in order to conserve power, the devices may conduct carrier sensing before transmitting data once a communication link has been established. The polling device includes a polling role switching indicator within ID_INFO 313A to advise the polled device of the status of polling role switching. As shown in FIG. 3, user device 305 is initially in a sleeping state (316) and therefore ignores the ID_INFO packet 313A transmitted. Accordingly, polling device 300 listens on channel 26 for a response over a predetermined length of time (322), but does not receive a response from the polled device. Before starting the sequence again with carrier sensing (328), the polling device 300 may itself, enter a sleep mode (325) for a predetermined length of time. The user may transition polled device 305, from a sleeping mode into a listening mode (318) (e.g., a user moving a wireless mouse after an period of inactivity). Alternately, the polled device may be programmed to periodically transition between sleep and listening states prior to establishing a communication link. The polled device 305 actively listens for the ID_INFO packet 313A. Coming out of its sleep mode (316), the advertising device repeats carrier sensing and retransmits the ID_INFO packet as 313A (328).

This time the polled user device 305, which now is in the listening mode (318), receives and processes the ID_INFO packet at step (337). In step (340), the polled device 305 prepares and transmits on channel 26, a responding ID_INFO_RSP packet 343A, to acknowledge receipt of the ID_INFO packet 313A. The polled device 305 indicates in ID_INFO_RSP 343A that polling role switching is not enabled and also that subsequent communication should be carried out on a data transmission channel, in this example specifically channel 5. After transmitting the ID_INFO_RSP packet 343A, the polled user device 305 switches to channel 5 (346) and begins listening for any data transmissions from the advertising device. Meanwhile, the polling device 300 receives and processes the ID_INFO_RSP 343A packet and switches to data transmission channel 5 (349), the data transmission channel designated by the polled device 305. At this point, a communication link has been established. Subsequent communications between the polling device 300 and the polled device 305 involve transmitting a data packet, DATA_PDU 350, from the polling device 300 to the polled device 305 at step (352), and the polled device 305 responding by transmitting (355) an acknowledgement 360 on the data transfer channel, channel 5.

Figure 4A:
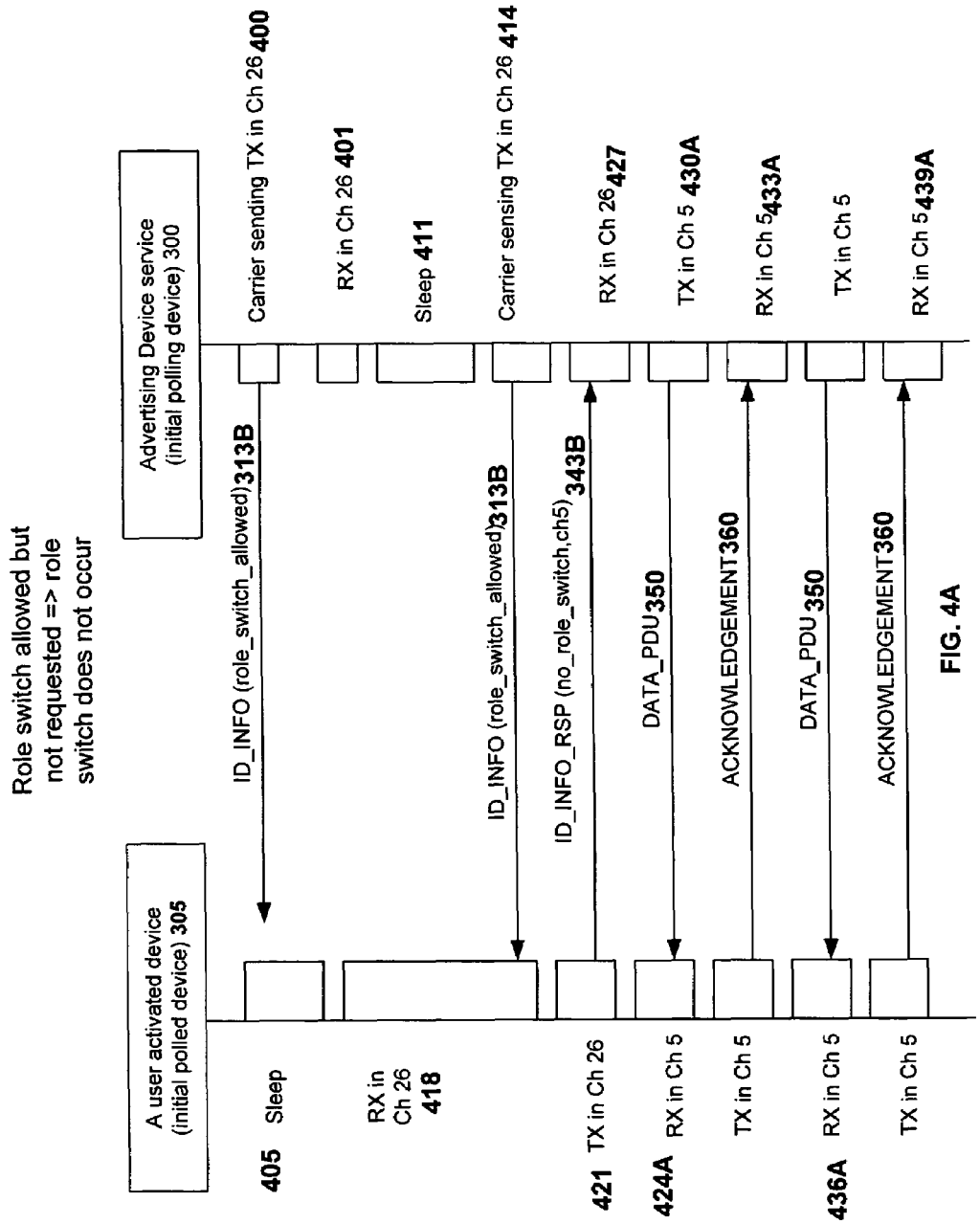
FIGS. 4A and 4B are exemplary operational flow diagrams, wherein device polling role switching is enabled by a polling device, and declined and accepted by a polled device, respectively.
Figure 4B:
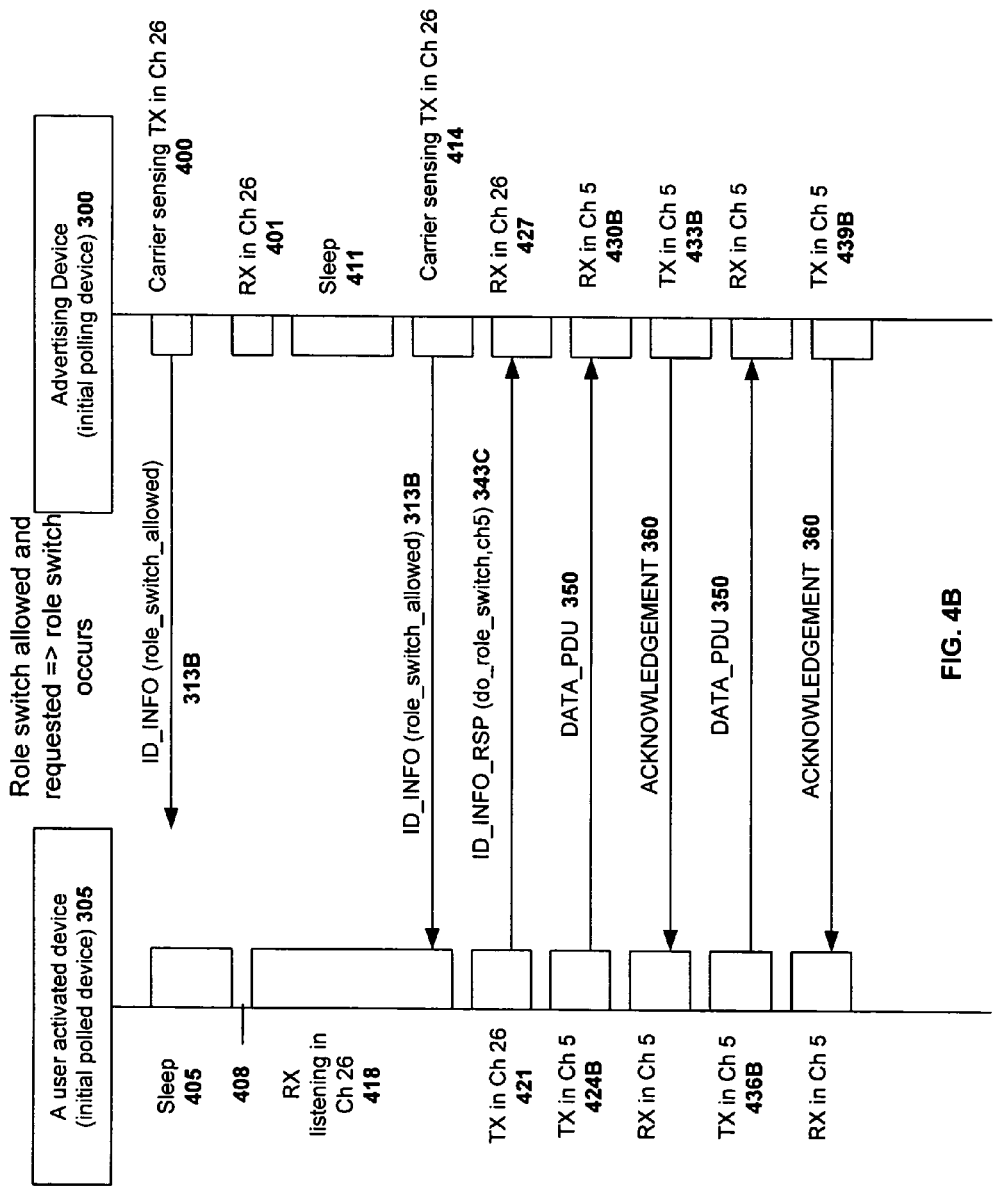

FIGS. 4A and 4B illustrate advertising device 300 and user device 305 establishing a communication link using a similar method as that illustrated in FIG. 3, except that the polling device's ID_INFO packet 313B includes an indicator that polling role switching is enabled. In FIG. 3, packet 313A illustrates the case when role switching is disabled. FIG. 4A illustrates advertising device 300 enabling the polling role switching indicator, whereas user activated device 305 denying polling role switching. In contrast, FIG. 4B illustrates advertising device 300 enabling the polling role switching indicator, while user activated device accepts polling role switching. For the purposes of the example in FIGS. 4A and 4B, advertising device 300 initially assumes the role of the polling device, as before, and user device 305 initially assumes the role of the polled device.

After conducting carrier sensing and determining the channel is clear for transmitting, the advertising device 300 attempts to initiate contact by transmitting the ID_INFO packet 313B on advertising channel 26. The advertising device 300 sets the role_switch_allowed flag in the packet ID_INFO 313B prior to transmission in step 400. After transmitting, the polling device transitions to a listening (receive) state on channel 26 (401). As in FIG. 3, the user device 305 also initially is in a sleep state (405) and therefore does not respond to the ID_INFO packet 313B. Subsequently, the user device 305 transitions during interval 408 from sleep state into a listening state 418. Having received no response from a polled device, the advertising device 300 also enters a sleep state for a predetermined length of time (411), at the end of which it retransmits the ID_INFO packet 313B at step (414). Since the user device 305 is at that particular moment in a listening state, it receives and processes the ID_INFO packet (418).

In the embodiment illustrated in FIGS. 4A and 4B, the advertising device 300 provides the user device 305 with the opportunity to switch roles, wherein the user device may transition from the polled device role to assume the polling device role. Likewise, the advertising device may transition from the polling device role to assume the polled device role.

In FIG. 4A, user device 305 prepares and transmits the ID_INFO_RSP packet 343B on advertising channel 26 (421). In the ID_INFO_RSP packet 343B, user device 305 confirms that subsequent data/service transfers will occur on channel 5. Also, user device 305 indicates in ID_INFO_RSP packet 343B that the devices will not switch roles—user device 305 remains the polled device and advertising device 300 remains the polling device. Accordingly, after receiving and processing ID_INFO_RSP 343B, advertising device 300 prepares and transmits DATA_PDU 350 on the designated data transmission channel in step (427). User device receives DATA_PDU 350 in step (421) and transmits ACKNOWLEDGEMENT 360 in response in step (424). The DATA_PDU/ACKNOWLEDGEMENT exchange process occurs until the communication link is terminated (i.e., the devices exit the connected state).

In FIG. 4B, user device 305 transmits ID_INFO_RSP 343C, indicating that polling role switching is accepted. Accordingly, user device 305, the initial polled device, assumes the role of the polling device by transmitting DATA_PDU 350 in steps (424B) and (436B). Similarly, advertising device 300, the initial polling device, assumes the role of the polled device receiving the DATA_PDU 350 and transmitting ACKNOWLEDGEMENT 360 in steps (433B) and (439B).

As noted earlier, LER devices that have established a wireless communication link and entered the connected state 125 (FIG. 1) may operate in two distinct operation modes—either the active mode, or the low activity mode. The active, or continuous data transfer, mode involves two devices implementing a periodic polling protocol, such as those illustrated in FIGS. 3 and 4. Low activity mode can be further divided into symmetrical low activity mode and asymmetrical low activity mode. An LER device may enter the symmetrical low activity mode, in which the advertising device and the user device enter a sleep state for the same predetermined duration between successive poll/acknowledgement sequences. In the asymmetrical low activity mode, the polling device and the polled device enter sleep states that have different durations. While in the sleep state, the polled device does not respond to a predetermined number of polling messages from the polling device. However, the polled device may respond earlier to the polling messages, if it has data to send.

In other embodiments of the invention, the polling frequency used for either, or both, the active and low activity modes may be either predetermined or dynamically determined. In either event, the devices tune to the data transfer channel, where one device periodically polls the other. In response, the polled device transmits an acknowledgement. This process continues until one of the devices disconnects.

The data transfer and acknowledge transmission steps 352 and 355 in FIG. 3 are operations associated with devices in the active mode wherein, once a communication link is set up, two devices continuously exchange data packets on a data channel according to a polling protocol. Accordingly, the polled device may only transmit packets in response to receiving a transmission from the polling device. As illustrated in FIGS. 3 and 4, the polling device transmits a DATA_PDU packet 350 to the polled device, and the polled device responds by transmitting an ACKNOWLEDGEMENT_PDU packet 360. Both of the packets have the same format and may have a payload up to 255 bytes. If the polled device does not at first acknowledge receiving the DATA_PDU packet 350, as occurs in the protocols of FIGS. 3 and 4, the polling device may retransmit the packet after a predetermined or variable timeout, depending on the application.

Figure 5A:
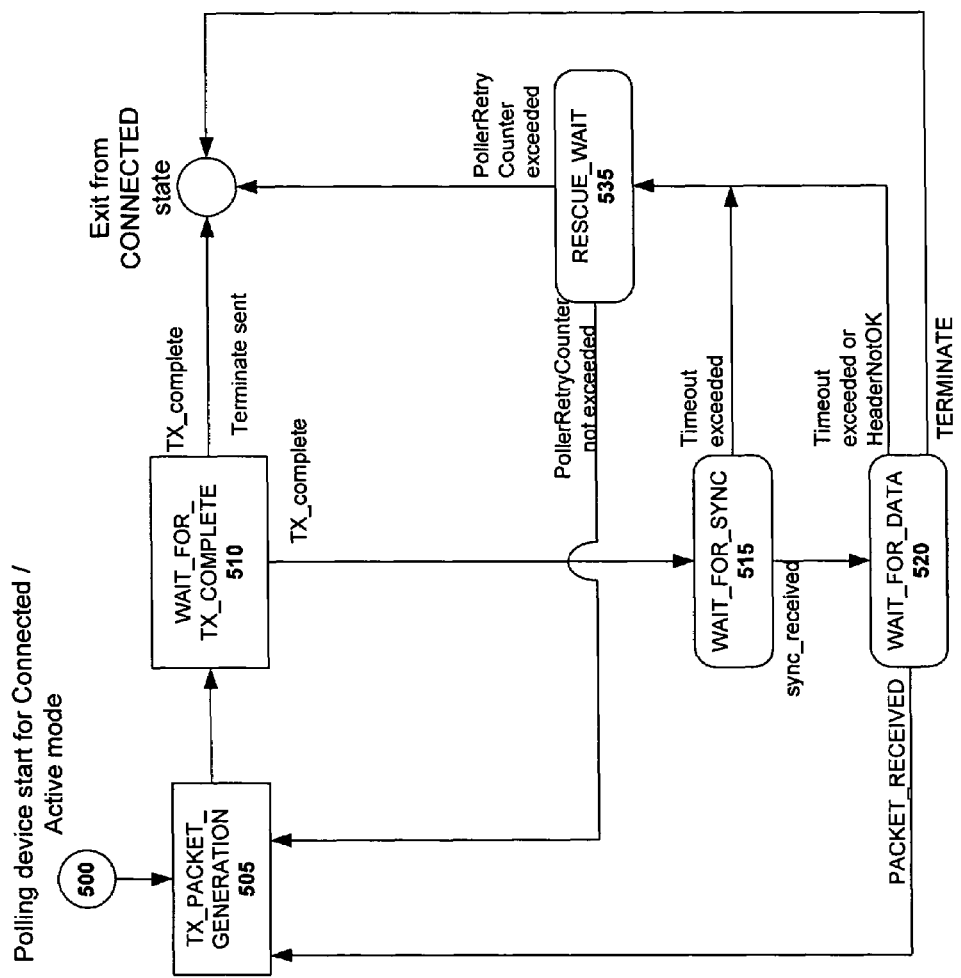
FIGS. 5A and 5B are operational state diagrams of optimized low-end radio devices implementing a continuous data transfer polling protocol for the polling and polled devices, respectively.

Referring to FIG. 5A, the internal operational states through which a polling device 500 transitions in a connected/active mode are depicted. Initially, polling device 500 generates the DATA_PDU packet in the TX_PACKET_GENERATION state 505 and transmits the packet on the data channel during the WAIT_FOR_TX_COMPLETE state 510. If the polling device 500 transmits a terminate message, it may exit from the CONNECTED state. If the polling device 500 transmits a packet other than the terminate message, the polling device 500 may transition to WAIT_FOR_SYNC 515 and wait to receive packet synchronization bits transmitted from the polled device (550 in FIG. 5B), which are transmitted by the polled device prior to the packet header of the ACKNOWLEDGEMENT_PDU. Once the synchronization bits are received, the polling device 500 transitions to the WAIT_FOR_DATA state 520 to wait for the rest of the acknowledgement packet. If the terminate message has been received, the polling device 500 transitions to exit from CONNECTED state. Otherwise, the polling device 500 transitions to TX_PACKET_GENERATION 505 to transfer additional data.

Figure 5B:
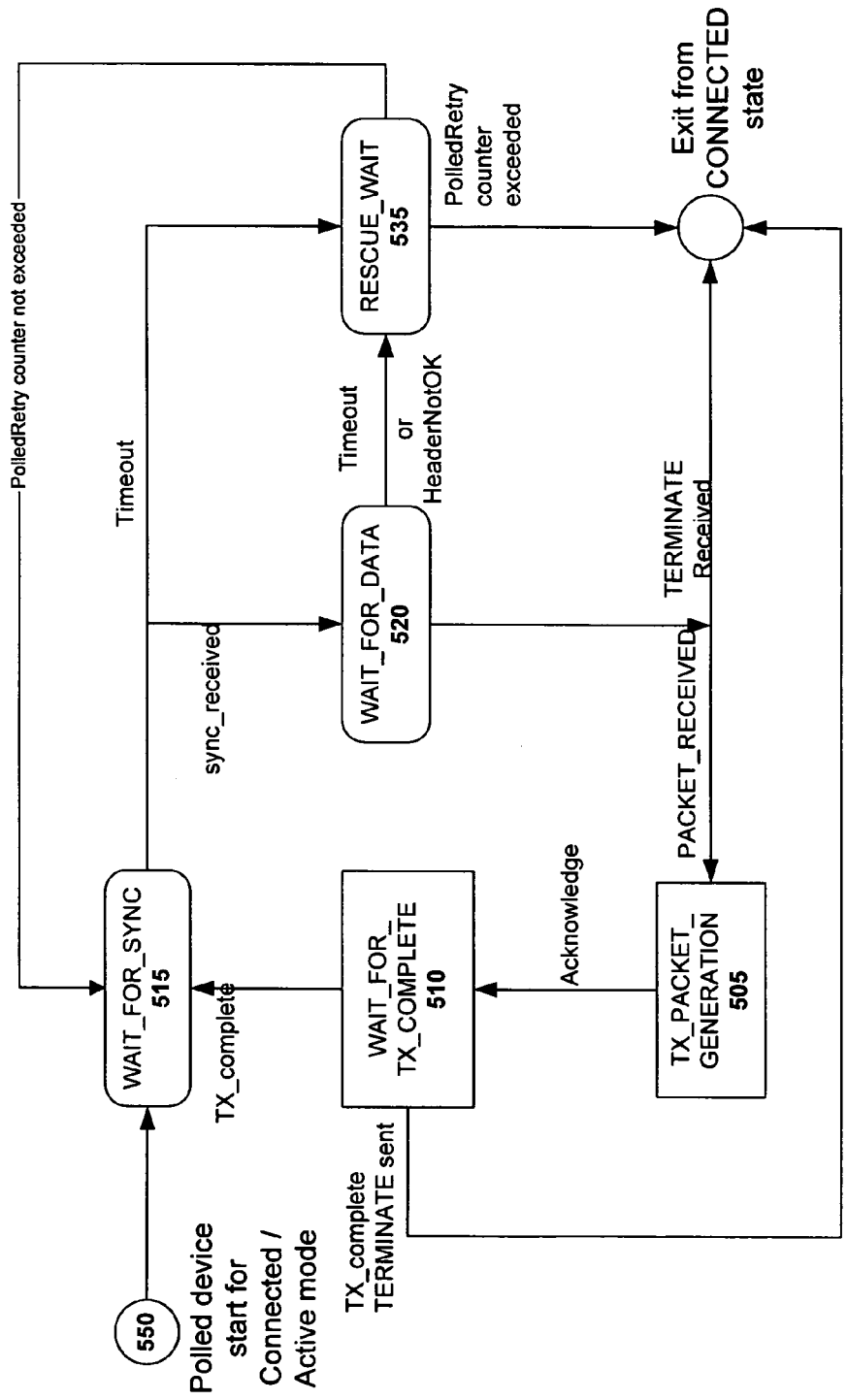

FIG. 5B shows the various states of the polled device 550 in the connected/active mode. Assuming that the polled device 550 is listening for a transmission from another device, it is in the WAIT_FOR_SYNC state 515. In normal operation, the polled device 550 transitions from the WAIT_FOR_SYNC state 515 to the WAIT_FOR_DATA state 520, as with the polling device. Upon receipt of the polling message (e.g., ID_INFO), the polled device 550 transitions<to the TX_PACKET_GENERATION 505 state to create an acknowledgement response message, which is transmitted in the WAIT_FOR_TX_COMPLETE state 510. Upon successfully transmitting the acknowledgement message, the polled device 550 then has two options (1) exit from the CONNECTED state, if the polled device transmitted the terminate message, or otherwise, (2) transition back to the initial WAIT_FOR_SYNC state 515 to wait for more data from the polling device 500. If the polled device received a terminate message from the polling device in WAIT_FOR_DATA state, it exits from the CONNECTED state.

FIGS. 5A and 5B also illustrate that the communicating devices incorporate both error detection and recovery states in the connected/active mode. An internal counter is initialized whenever the respective devices enter the WAIT_FOR DATA or WAIT_FOR_SYNC states. If the counter exceeds a timeout duration, the device has not received the expected packet, or if the packet header is not OK, the device may transition into a RESCUE_WAIT state 535. Device controllers respectively implement two counters to count the sequential non-received packets—(i) PollerRetryCounter 540 and (ii) PolledRetryCounter 541. Each time a device transitions into the RESCUE_WAIT state 535, the corresponding counter is incremented. The counter is reset after successful packet switch. After incrementing the counter's value, the device transitions back to its respective initial state for the particular device, i.e., TX_PACKET_GENERATION 505 for the polling device and WAIT_FOR_SYNC 515 for the polled device. If the counter exceeds a predetermined threshold corresponding to the number of consecutive packets lost, the device exits from the CONNECTED state and terminates the connection. After terminating the connection, the device transitions back to either advertising mode 110 or idle mode 105 (FIG. 1). Otherwise, if the Poller/PolledRetryCounter is not exceeded, a device may transition back to the initial TX_PACKET_GENERATION (FIG. 5A) or WAIT_FOR_SYNC (FIG. 5B). The device transitions back to the mode it was in before entering the connected mode 125.

Figure 6:
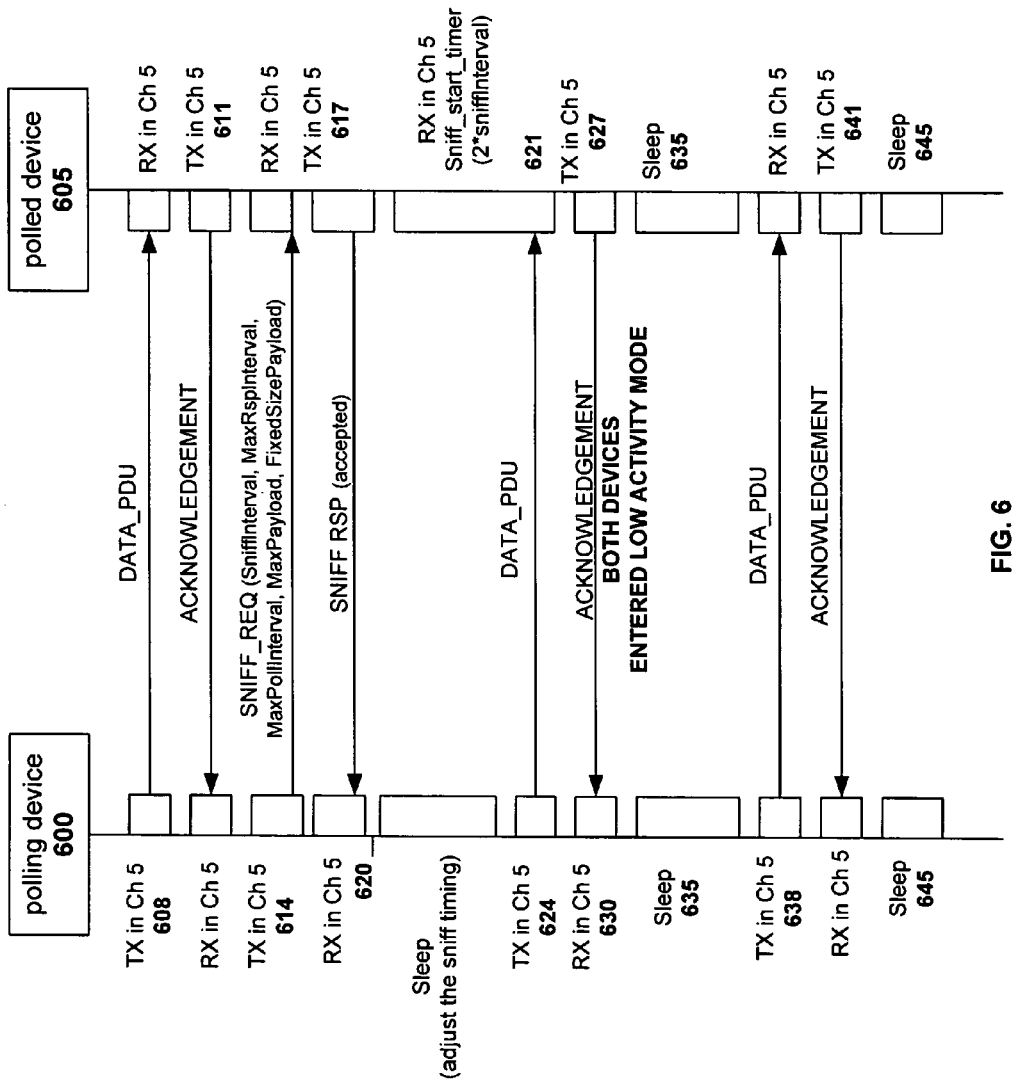
FIG. 6 is an exemplary operational flow diagram illustrating a symmetrical polling protocol in a low activity mode.

Alternately, as illustrated in FIG. 6, a device may be connected and in a low activity mode (sniff mode), which enables a slower, but periodic data packet exchange between connected devices. As will be described below, the greater lengths of time associated with periodic communications between a polling device and a polled device, facilitate maintenance of the communication link, while decreasing power consumption. These embodiments achieve data transfers that are faster than if two unconnected devices have to establish a communication link anew in order to transfer data.

Once the polling roles are established, the devices may transfer the data according to a polling protocol, (e.g. active or continuous data transfer mode, symmetrical low activity mode, or asymmetrical low activity mode). Either the polling device, or the polled device in the active mode, may initiate a transition to the low activity mode. Also, either device may modify the low activity parameters when the devices are in low activity mode. Specifically, to initiate a transition to the low activity mode, a device transmits a sniff request packet, which shares the same general packet format as the packets used in the other operational modes discussed above. The payload, however, contains several low activity mode indicators SNIFFINTERVAL (sniff interval), MAXRSPINTERVAL (maximum response interval), MAXPOLLINTERVAL (maximum poll interval) MAXPAYLOAD (maximum payload), and FIXEDSIZEPAYLOAD (fixed size payload). The SNIFFINTERVAL is an 8-bit field defining the polling interval. Depending on the application, the interval may be calculated through an equation, for example, $(2^{\wedge}(x+1)+2*y)*3*0.625$ [ms], where x is the four most significant bits of the field, and y represents the four least significant bits. The MAXRSPINTERVAL is an 8-bit field defining the number of ignorable poll packets (i.e. the number of consecutive polling messages to which the polled device does not need to prepare and transmit a response). The MAXPOLLINTERVAL is an 8-bit field defining the number of poll packets that the polling device may refrain from transmitting (i.e., the number of consecutive polling messages that the polling device need not transmit). The MAXPAYLOAD is an 8-bit field defining the maximum allowable packet payload in bytes during the low activity mode. Finally, the FIXEDSIZEPAYLOAD, a 1-bit field, defines whether or not all of the transmitted and received packets will be the same size. In the event that the FIXEDSIZEPAYLOAD indicator is enabled, the payloads of all packets will correspond to the MAXPAYLOAD value.

FIG. 6 illustrates an operational flow diagram of two devices implementing the symmetrical low activity mode. Initially, a polling device 600 and a polled device 605 may transmit data packets and acknowledgements as shown (608, 611) in the manner previously described. Either device may initiate the transition to the low activity mode (sniff mode). In the embodiment illustrated in FIG. 6, the polling device 600 prepares and transmits to the polled device a low activity (sniff) request (614) containing the parameters discussed above. The polled device 605 prepares and transmits a sniff response accepting the transition request (617).

In accordance with the sniff request and response, the polling device enters a sleep mode, corresponding to the value of the parameter MAXPOLLINTERVAL, to establish the sniff timing (620). The polling device 600 may use this initial sleep period to coordinate the low activity mode connection with polled device 605 and with any other low activity connections that the polling device 600 may be managing. The polled device 605 initiates a low activity mode (sniff) timer and awaits receipt of the first low activity mode transmission (621). Accordingly, the polling device 600 prepares and transmits the first sniff data packet DATA_PDU (624). The data packets may be transmitted according to a fixed-time interval with the interval starting with the completion of the transmission of the polling message. The polled device 605 receives this initial sniff data packet and responds by transmitting an acknowledgement (627). The acknowledgement is received and processed by the polling device 600 (630). The devices have now entered low activity mode, and both enter a sleep mode corresponding to a sniff interval (635). The devices wake from the sleep mode with the polling device 600 conducting a data transfer (638) and the polled device 605 transmitting an acknowledgement (641). After the data transfer/acknowledgement, the devices once again enter the sleep mode (645). The symmetrical sleep states with both devices sleeping for an equal duration are indicative of the symmetrical low activity mode.

Generally, during a low activity mode connection, the device polling roles remain the same as determined during the connection setup. In the low activity mode, the devices may enter a sleep state between completed data transfer/acknowledgement sequences to conserve power. Under the circumstances discussed below, a polled device in an asymmetrical low activity mode may enter an extended sleep state. In order to enter low activity mode, either device may prepare and transmit a new sniff request with a new set of sniff parameters at any time the devices are connected (e.g., after a data transfer has occurred). A sniff request, for example, by setting all of the sniffinterval bits to one, may terminate the low activity mode connection. Depending on the application, the connection between devices may be terminated, (i.e., stopped) or the connection may revert to active mode (i.e., continuous data transfer). The connection in low activity mode terminates in a manner similar to the active mode—due to the transmission or reception of a termination message or due to an error condition (no packets received).

Figure 7A:
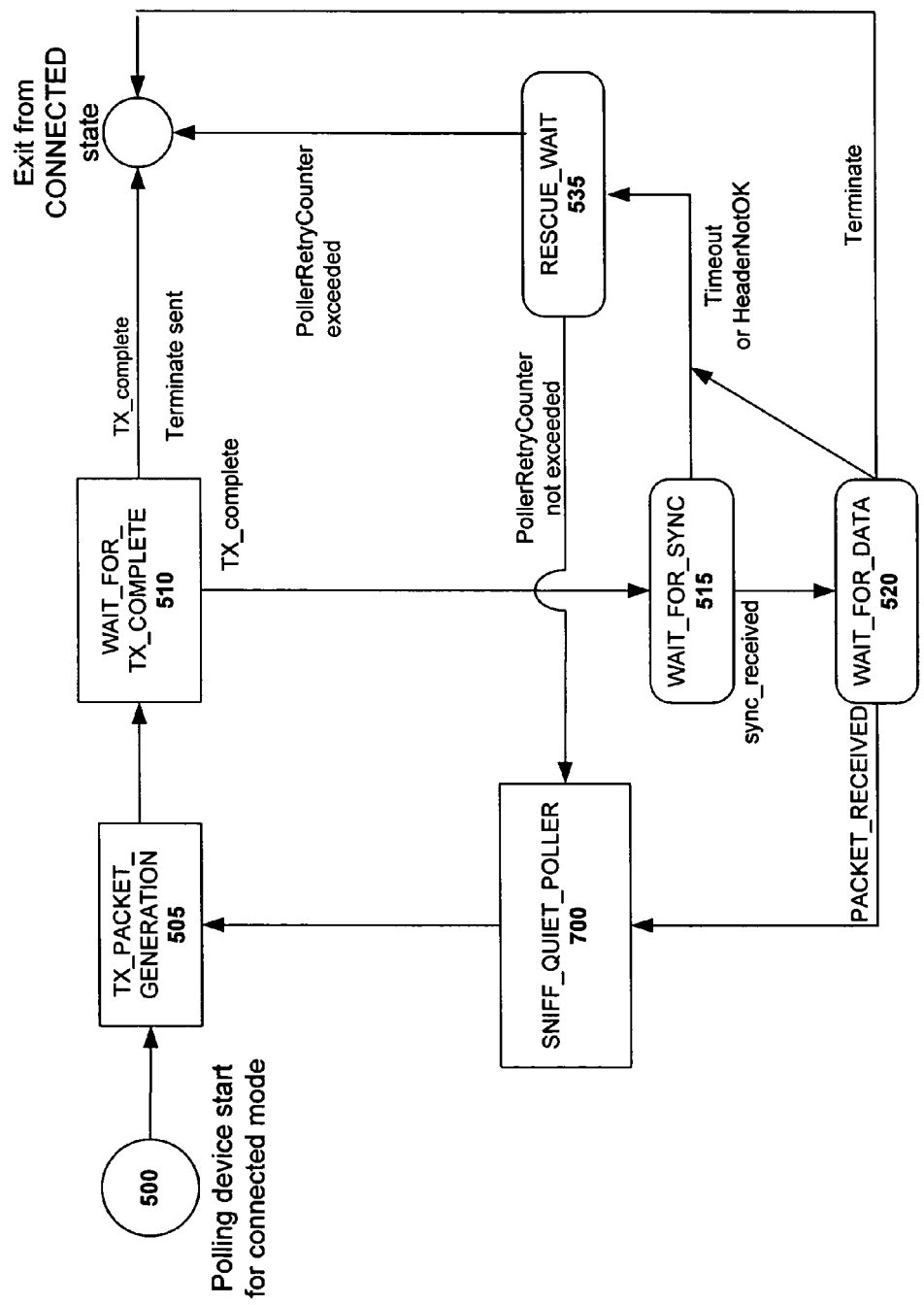
FIGS. 7A and 7B are operational state diagrams of optimized low-end radio devices implementing a low activity mode for the polling and polled devices, respectively.
Figure 7B:
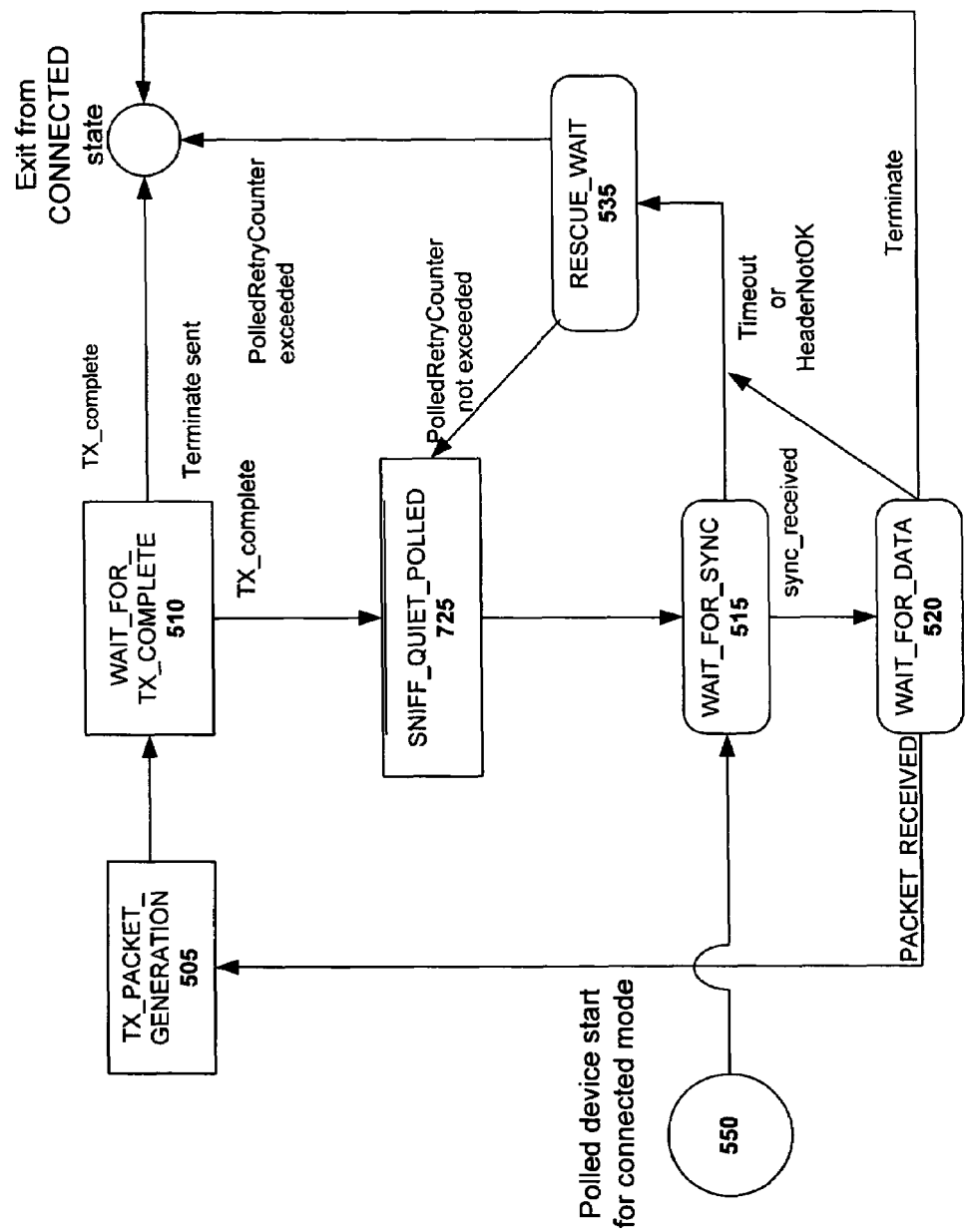

FIGS. 7A and 7B illustrate the operational states and the transitions between states for polling devices in the low activity mode. The states are the same as those discussed in connection with FIG. 6 with the exception of two additional device-specific states—SNIFF_QUIET_POLLER 700 (polling devices) in FIG. 7A and SNIFFQUIET_POLLED 725 (polled devices) in FIG. 7B. The polling device 500 enters the SNIFF_QUIET_POLLER state 700 in FIG. 7A, after it has received a packet from the polled device, or after the following error cases from the RESCUE_WAIT 535 state: the polling device (1) has received a packet with a bad packet header or (2) timed out while trying to receive a packet from the polled device 550 in WAIT_FOR_DATA 520. In FIG. 7B polled device 550 enters SNIFF_QUIET_POLLED 725, either after it has transmitted its packet in WAIT_FOR_TX_COMPLETE 510, or from the RESCUE_WAIT 535 state if it has not received the polling message. Devices operating in the "SNIFF" state usually enter a sleep mode in the SNIFF_QUIET_POLLED/POLLER states. During low activity mode, the devices may enter the sleep state, or alternately, may establish and maintain connections with other devices. It is easier for the polling device to manage multiple connection. Alternately, if devices are in the low activity mode, the polling device 500 may establish a connection or communicate with another polled device.

The connection in low activity mode terminates in the method described above, for example, by sending a sniff request with all sniff interval bits set to one, or when a device fails to respond to repeated to polling retransmissions. The device in the RESCUE_WAIT state 535 terminates the connection, if the PollerRetryCounter value shown in FIG. 7A, or the PolledRetryCounter shown in FIG. 7B, exceeds a termination threshold and exits the CONNECTED state. If the counter values do not exceed the termination thresholds, the polling device in FIG. 7A transitions to SNIFF_QUIET_POLLER 700, whereas the polled device in FIG. 7B transitions to SNIFF_QUIET_POLLED 725.

In a symmetrical low activity connection, as illustrated in FIG. 6, the polled device should receive and respond to each polling packet (MAXRSPINTERVAL=0). However, in an asymmetrical low activity connection, the polled device does not have to respond to each polling packet. The number of packets that the polled device may ignore is equal to the value of the MAXRSPINTERVAL sniff parameter. Similarly, the MAXPOLLINTERVAL is a number of polling packets that the polling device may refrain from transmitting in a low activity connection. The embodiment of the invention illustrated in the Figures is directed to a number of packets that are not transmitted or received by the polling device or polled device respectively, as either or both of the devices enter an extended sleep state (long activity mode). It is to be understood that the polling/polled device may enter an extended sleep state that is based on an alternate parameter, such as time (e.g., polling/polled device enters a sleep mode for X milliseconds). For a low activity device, the polling device increases its polling retry counter only after it has not received a number of responses that corresponds to the value of the MAXRSPINTERVAL.

The symmetrical low activity mode is useful in applications, for example, where the polling device frequently sends control data. In contrast, asymmetrical low activity mode is useful in applications where polled devices do not have periodic data to send or do not need to receive data on a regular basis. Several examples of asymmetrical devices may include wireless mice, keyboards and remote controllers. Generally, these devices transmit data if a user provides a direct input to the device. The inputs may be time critical. Therefore, it is worthwhile to maintain a connection and avoid the time associated with establishing a new connection.

Polling devices, such as personal computers or televisions generally do not rely on low power operability in the same way a wireless mouse or headset would. Accordingly, such polling devices are able to maintain a relatively high polling frequency (MAXPOLLINTERVAL=0), so that when the polled device does respond, the data transfer rate is relatively fast, as compared with establishing a new connection and transferring the data. However, in the case of a polling device that advantageously uses low power operability (e.g., a laptop), the polling device may selectively refrain from transmitting polling messages (MAXPOLLINTERVAL>0) during a low activity connection. In such an implementation, the polling device may refrain from transmitting the number of polling messages indicated by the value stored as MAXPOLLINTERVAL. This allows a power sensitive device such as a laptop to conserve power, while maintaining a connection with a polled device.

During asymmetrical low activity mode, there are two instances in which a polled device may not enter an extended sleep state. When the polled device responds to the polling device, the polled device must acknowledge any received additional polling packets if either of two conditions is true (1) the payload packet is not empty or (2) the poll packet contains a negative acknowledgement (NACK). A non-empty Poll PDU payload signifies that the polling device is currently transmitting data. A NACK indicates that the polling device has not received an error free response to previous Poll PDU. If neither of these conditions (payload not empty or NACK) is true, then the polling device has completed the data transfer or has indicated that the acknowledgement sent by the polled device in response to the previous polling message was properly received, and the polled device may now enter an extended sleep state.

Figure 8A:
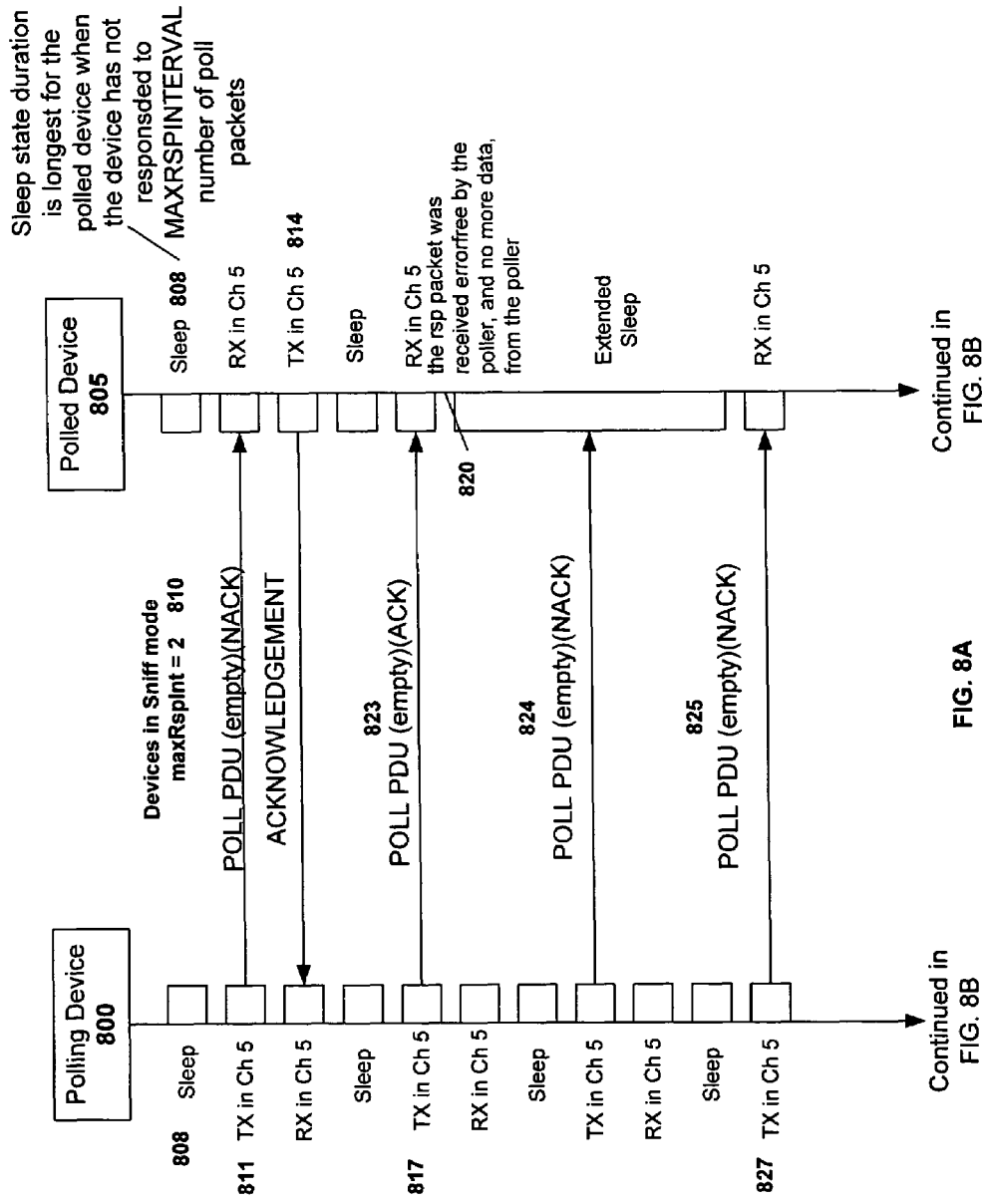

FIGS. 8A and 8B are an operational flow diagram of an asymmetrical low activity mode communication link between polling device 800 and polled device 805. In FIG. 8A, the polling device 800 and polled device 805 are initially in a sleep state 808. In this mode, each device sequences through the transmit (TX), receive (RX), and sleep states, each of which may have a predefined duration. The polled device, however, may extend its sleep periods—in accordance with the parameters agreed upon. Polling device 800 transmits a Poll PDU with an empty payload and a NACK at step (811). As discussed above, the polled device must prepare and transmit an acknowledgement (814), because the NACK indicates that the polled device's response to the previous Poll PDU was not received. The polling device 800 transmits an empty payload in the Poll PDU, but includes a positive acknowledgement indicator (ACK) (817). The ACK indicates that the previous polled device response packet was properly received by the polling device 805. The ACK, in coordination with the empty data payload, enables the polled device 805 to enter an extended sleep state 820, as noted above, during which it ignores a predetermined number 810 (MAXRSPINTERVAL value=2) of polling device Poll PDUs. For example, assuming the MAXRSPINTERVAL value 810 associated with the embodiment illustrated in FIG. 8A is two, the polled device 805 does not have to respond to the two Poll PDUs 823 and 824. However, polled device 805 should be ready to receive and acknowledge the next Poll PDU 825.

Continuing with FIG. 8B, the polled device 805 responds to a third Poll PDU 825 (from FIG. 8A). The polled device 805 transmits the ACKNOWLEDGEMENT 830 (833). The polling device 800 receives at step (836), the ACKNOWLEDGEMENT 830. It thereupon prepares the Poll PDU 842, indicating that the polling device does not have additional data to transfer and that ACKNOWLEDGEMENT 830 was properly received, and transmits Poll PDU 842 at step (839). Since Poll PDU 842 indicates that the payload is empty and the ACKNOWLEDGEMENT 830 was properly received, polled device 805 may enter an extended sleep state 845.

Figure 9A:
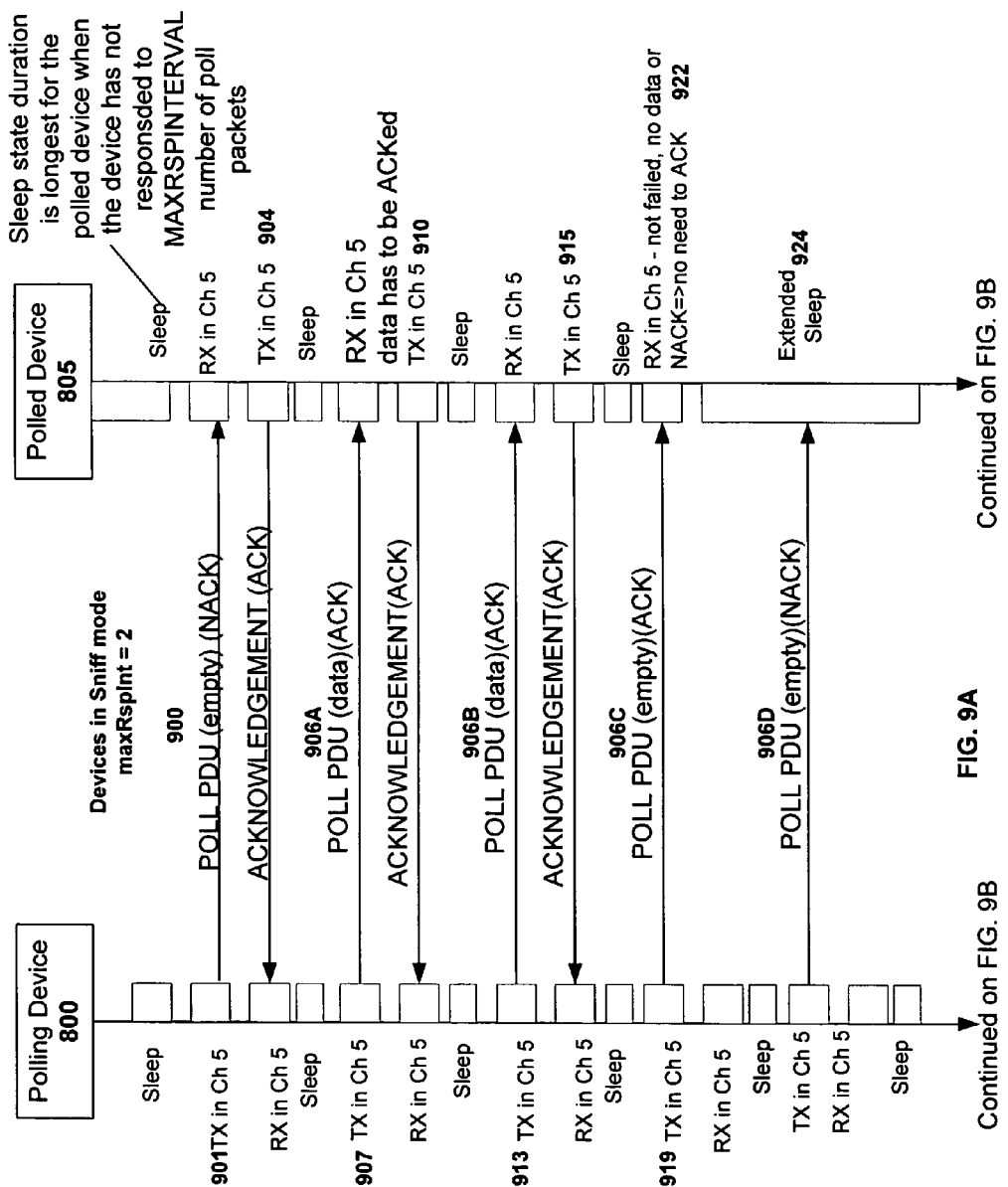

FIGS. 9A and 9B are an operational flow diagram of an asymmetrical polling protocol, where the polled device enters an extended sleep state after the polling device has finished transferring a block of data through two Poll PDU data transfers. Polling Device 800 prepares and transmits a Poll PDU 900, comprising an empty payload, and a NACK (901). Polled device 805 receives the Poll PDU 900, and transmits an ACKNOWLEDGEMENT, as required by the NACK indicator (904).

Polling Device 800 starts a data transfer (907), by transmitting a Poll PDU 906A with data in the payload. Polled device 805 transmits an ACKNOWLEDGEMENT, since data was transferred in Poll PDU 906A (910). Polled device 805 must actively receive any additional data that the polling device 800 may transfer during subsequent Poll PDUs, such as Poll PDU 906B transmitted by the polling device 800 at step 913. After receiving the transferred data, polled device 805 again issues an ACKNOWLEDGEMENT in step 915 and waits for additional data. Assuming polling device 800 transmits Poll PDU 906C with an empty payload at step 919, the polled device 805 processes the Poll PDU 906C at step 922 and determines that Poll PDU 906C has an empty payload and an ACK indicator. Therefore, polled device 805 may enter an extended sleep state (924). According to the MAXRSPINTERVAL value discussed above, the polled device 805 may ignore two Poll PDUs, including 906C and 906D. Thereafter, referring to FIG. 9B, polled device 805 must listen for the next Poll PDU 906E sent on data transfer channel 5. As discussed above, because no acknowledgement to the last Poll PDU was transmitted by the polled device 805, Poll PDU 906E includes a NACK indicator. Therefore, the polled device 805 must in this instance now acknowledge receipt (930).

Figure 10:
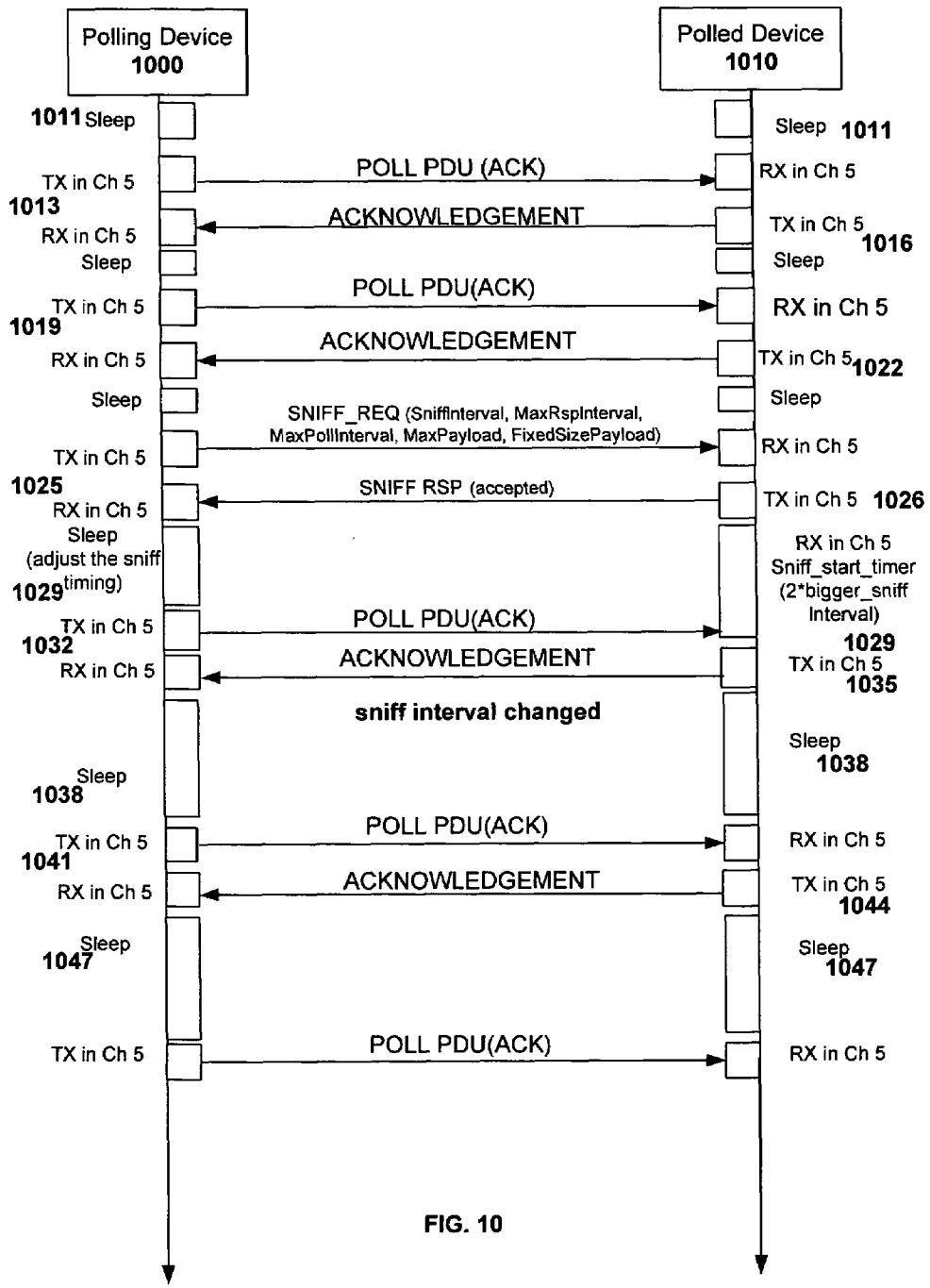
FIG. 10 illustrates an exemplary operational flow diagram, wherein the devices modify the sniff interval.

FIG. 10 illustrates the devices in a symmetrical low activity mode, when the polling device initiates a change in the sniff interval. Polling device 1000 and polled device 1010 are in a symmetrical low activity mode (MAXRSPINTERVAL=MAXPOLLINTERVAL), implementing a sniff interval as shown with sleep state 1011. Polling Device 1000 transmits Poll PDU packets in steps (1013) and (1019), respectively. Polled device 1010 responds, in turn, by transmitting an ACKNOWLEDGEMENT in steps (1016) and (1022). In step (1025), the polling device transmits a sniff request packet including proposed new values for the SNIFFINTERVAL, MAXRSPINTERVAL, MAXPOLLINTERVAL, MAXPAYLOAD, and FIXEDSIZEPAYLOAD parameters. Polled device 1010, transmits a sniff response in step (1026), accepting the new parameters. Depending on the specific application, the polled device may reject the proposed MAXRSP and MAXPOLL intervals and either request or propose different values for these parameters, in a negotiation process (described in FIG. 12). The polling device 1000 and polled device 1010, use step (1029) to make the necessary adjustments to the transmission/reception timing to implement the new parameters. Accordingly, polling device transmits a Poll PDU in step (1032), and polled device 1010 responds with an ACKNOWLEDGEMENT in step (1035). Upon transmission of the ACKNOWLEDGEMENT by the polling device 1010 and receipt by the polled device 1000, the devices transition into sleep state 1038 in accordance with the new sniff interval parameters. The devices continue the process of transmitting a Poll PDU, as in step (1041), transmitting a corresponding ACKNOWLEDGEMENT 1044, and entering sleep state 1047.

Figure 11:
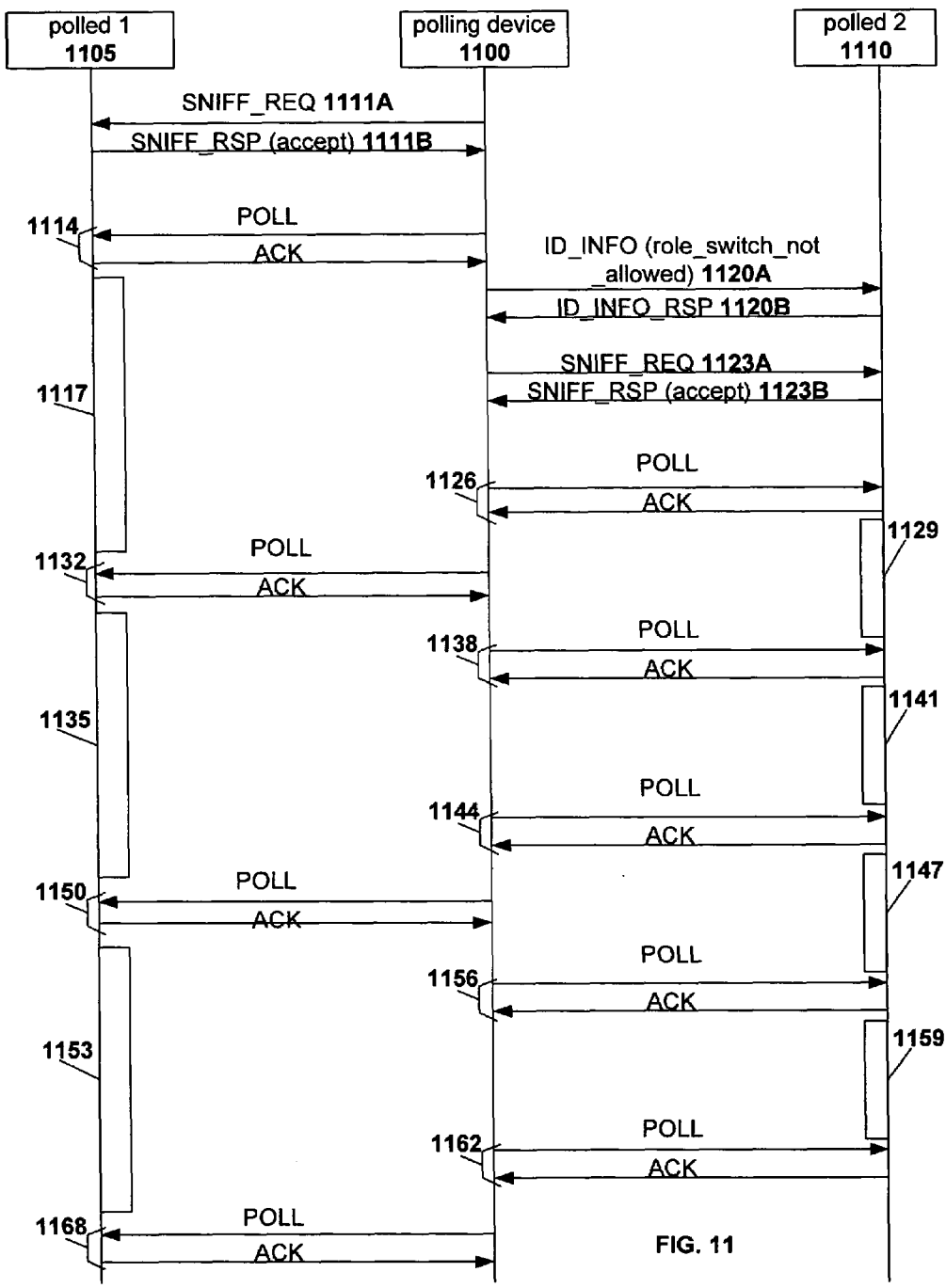
FIG. 11 is an operational flow diagram of a polling device managing multiple communication links in a low activity mode optimized low-end radio devices implementing a low activity mode for the polling and polled devices, respectively.

FIG. 11 illustrates an exemplary embodiment of a low activity mode in the present invention where a polling device manages communications with two polled devices. Polling device 1100 establishes and maintains a communication link with polled devices 1105 and 1110, respectively. As illustrated in FIG. 11, in order to maintain the communication links with multiple devices, the polling device establishes two distinct polling modes.

As illustrated in FIG. 11, polled device 1105 sends sniff request packet 111A and polling device 1100 responds with sniff response 1111B accepting the sniff parameters, as discussed above. With the sniff parameters for polling device 1100 and polled device 1105 established, the devices exchange the Poll PDU and the ACKNOWLEDGEMENT in step (1114), as described above. After transmitting the ACKNOWLEDGEMENT in step (1114), polled device 1105 enters a sleep state 1117, in accordance with the parameters in the sniff request 1111A. As polled device 1105 sleeps in 1117, polling device 1100 transmits ID_INFO 1120A (with role switching disabled). Polled device 1110 receives ID_INFO 120A and responds by transmitting ID_INFO_RSP 1120B, requesting a data transfer. The polling device transmits SNIFF_REQ 1123A to establish a low activity mode transfer. As discussed above, SNIFF_REQ 1123A includes the low activity mode timing parameters. In turn, polled device 1110 transmits SNIFF_RSP 1123B accepting the sniff parameters and prepares for the subsequent data transfer.

After the low activity mode operational (sniff) parameters are established between polling device 1100 and polled device 1110, polling device conducts Poll PDU/ACKNOWLEDGMENT exchange 1126. Upon completion of exchange 1126, polled device 1110 enters extended sleep state 1129. When polled device 1110 is in sleep state 1129, polling device 1100 conducts a Poll PDU/ACKNOWLEDGEMENT exchange 1132 with polled device 1105, after polled device 1105 exits extended sleep state 1117. Subsequently, polled device 1105 transitions into sleep state 1135, after transmitting the ACKNOWLEDGEMENT, as part of exchange 1132. Polling device 1100 conducts Poll/Ack exchange 1138 with polled device 1110, after polled device exits extended sleep state 1129.

As illustrated in FIG. 11, polling device 1100 implements a sleep state with a shorter duration with polled device 1110 (MAXPOLLINTERVAL<MAXRSPINTERVAL), than with polled device 1105. Accordingly, polled device 1110 exits sleep state 1141 and participates in Poll PDU/ACKNOWLEDGEMENT exchange 1144, while polled device 1105 is still in sleep state 1135. Polling device 1100 manages and maintains multiple data transfers in subsequent Poll PDU/ACKNOWLEDGEMENT exchanges 1150, 1168 with polled device 1105, and exchanges 1156, 1162 with polled device 1110, while the non-active device is in a sleep state 1153 or 1147, 1159, respectively.

Figure 12:
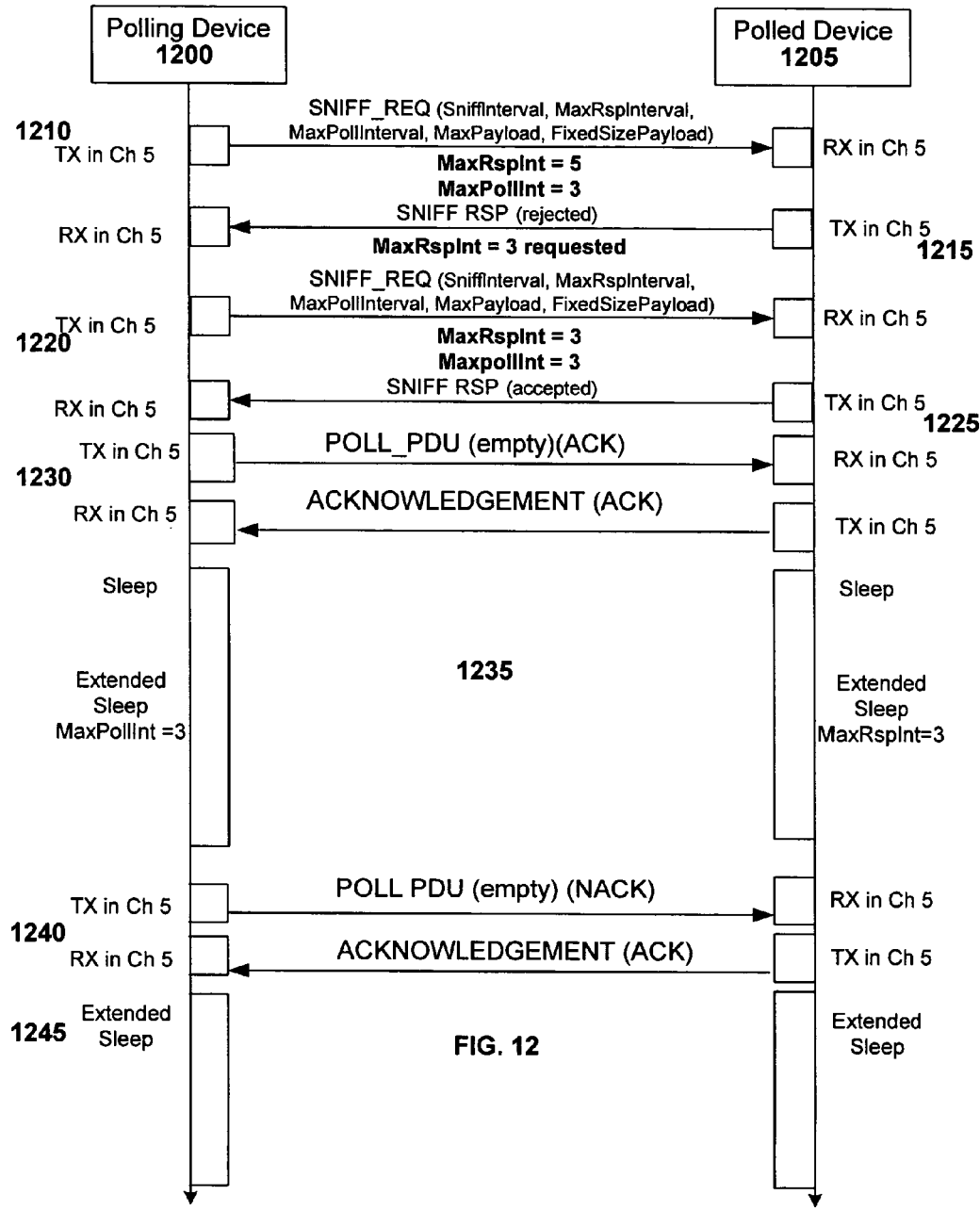
FIG. 12 illustrates an exemplary operational flow diagram, wherein the polling device and polled device negotiate and enter an extended sleep state.

FIG. 12 illustrates the device negotiation of the extended sleep state. Polling device 1200 transmits a SNIFF REQ at step (1210). The SNIFF REQ proposes entering an extended sleep state (low activity mode) with the low activity parameters set to MaxRspInt=5 and the MaxPollInt=3 (i.e., the number of polling messages the polled device 1205 may ignore is 5, whereas the number of polling messages the polling device 1200 may selectively refrain from transmitting is 3). The polling device 1200 does not necessarily have to refrain from transmitting any polling messages, but in accordance with the MaxPollInt=3, the polling device 1200 cannot refrain from transmitting more than three polling messages during a given extended sleep mode.

In the exemplary embodiment, it is assumed that the polled device 1205 wishes to maintain a quicker connection with the polling device 1200 (i.e., short sleep periods that provide faster data updates/transfers). Accordingly, the SNIFF RSP message transmitted by the polled device in step (1215) indicates that the proposed SNIFF REQ is rejected. The SNIFF RSP includes a new proposed MaxRspInt=3. Polling device 1200 receives the SNIFF RSP and updates the MaxRspInt parameter with the new proposed value. Polling device 1200 thereupon transmits an updated SNIFF REQ in step (1220) that reflects the requested new value of MaxRspInt=3. The polled device 1205 recognizing an acceptable activity parameter, transmits an acceptance of the updated sniff request in step (1225).

Once the low activity parameters are established, data transfer in a low activity mode is executed. The devices transmit data in poll event 1230 and then enter extended sleep state 1235 in accordance with the negotiated low activity parameter(s). As illustrated in FIG. 12, in accordance with the accepted parameter set, the polling device 1200 refrains from transmitting three polling messages and the polled device 1205 ignores three polling messages. It is to be understood that the process of "ignoring" a polling message ordinarily means the polled device can refrain from tuning to the designated transmission channel to attempt to receive (listen for) a polling message. After the extended sleep period is complete, the devices execute poll event 1240 and then enter extended sleep in step (1245). It is to be understood that either the polling device 1200 or the polled device 1205 may reject a sniff request and propose alternate low activity parameters.

One of the advantages of the optimized system is that the system provides a more efficient way of synchronizing the transmission/response interactions of the communication devices. In the embodiment described herein, both the polling/polled devices are informed when the other device will transmit/listen for a polling message. The optimization conserves power by minimizing the transmission of polling messages when the polled device is not listening and will not respond. Similarly, the optimization conserves power by minimizing the periods of time when the polled device listens for a polling message on the transmission channel.

From the foregoing exemplary embodiments, it is readily appreciated that the optimized low-end radio protocol provides flexible connectivity attributes, as well as low power consumption characteristics for both polling and polled devices. For instance, in maintaining a communication link in both low activity modes, symmetrical and asymmetrical, a faster data transfer is achieved than found in unconnected devices that must re-establish a communication link before transferring data. Devices implementing the optimized low-end radio protocol's low activity mode may conserve power by periodically entering a sleep state. Devices implementing the low activity mode sleep state in coordination with polling role switching, obtain higher power conservation, since power sensitive devices may delegate or assume the role of polling/polled device.

The embodiments described above are exemplary, and numerous modifications and variations will readily occur to those skilled in the art without departing from the true spirit and scope of the invention. The many features and advantages of the present invention are apparent from the foregoing description of preferred embodiments. It is accordingly intended that all such modifications and variations be comprehended by the appended claims.

We claim:

1. A method, comprising:
  transmitting a low activity request message including proposed low activity parameters from a polling device to a polled device, wherein the low activity parameters specify a number of polling messages the polling device may refrain from transmitting;
  receiving a low activity response message from the polled device, and
  entering a low activity mode based on the set of parameters included in the low acitivity request message, wherein the low activity mode reduces power consumption in the polling device.

2. The method of claim 1, wherein:
  during said processing of the low activity messages, the polling device and the polled device each transmit at least one additional message.

3. The method of claim 2, wherein:
  said at least one additional message transmitted by the polled device indicates the number of polling messages to which the polled device will not respond during the low activity mode.

4. The method of claim 2, wherein:
  said at least one additional message transmitted by the polling device indicates the number of polling messages the polling device may refrain from transmitting during the low activity mode.

5. The method of claim 2, wherein the low activity mode is asymmetrical, wherein the polled device and the polling device enter low activity modes of different time durations.

6. The method of claim 2, wherein the low activity mode is symmetrical, wherein the polled device and the polling device enter low activity modes of equal time durations.

7. The method of claim 2, wherein the polling and polled devices implement a modified Bluetooth wireless communication protocol.

8. The method of claim 7, wherein a Bluetooth master device assumes a polling device role.

9. The method of claim 2, wherein the polling and polled devices implement a modified low-end radio wireless communication protocol.

10. A polling device, comprising:
  a memory configured to store instructions; and
  a processor configured to process said instructions to cause the polling device to:
    transmit from the polling device a low activity request message to a polled device, the low activity request message including proposed low activity parameters, wherein the low activity request parameters specify a proposed number of polling messages the polling device may refrain from transmitting;
    receive a low activity response message from the polled device; and
    enter a low activity mode for a time interval based on parameters from the low activity messages, wherein the low activity mode reduces power consumption in the polling device.

11. The polling device of claim 10, wherein:
  the low activity response message accepts the low activity parameters.

12. The polling device of claim 10, wherein:
  the low activity response message rejects the low activity parameters in the low activity request message.

13. The polling device of claim 12, wherein:
  the low activity response message includes proposed new low activity parameters.

14. The polling device of claim 13, further comprising instructions for causing the polling device to:
  transmit an updated low activity request message based on the proposed new low activity parameters from the polling device; and
  receive a new low activity response message accepting the updated low activity request message.

15. The polling device of claim 10, wherein the polling and polled devices implement a modified low-end radio communication protocol.

16. A polled device, comprising:
a memory configured to store instructions; and
a processor configured to process said instructions to cause the polled device to:
receive from a polling device a low activity request message including low activity parameters, wherein the low activity parameters specify a maximum number of polling messages occurring before the polling device accesses a data transfer channel;
transmit a low activity response message to the polling device; and
maintaining connection with the polling device for a time interval the polling device may refrain from accessing a data transfer channel in accordance with low activity parameters included in the low activity message.

17. The polled device of claim 16, wherein:
the low activity response message accepts the low activity parameters in the low activity request message.

18. The polled device of claim 16, wherein:
the low activity response message rejects the low activity parameters in the low activity request message.

19. The polled device of claim 18, wherein:
the low activity response message includes proposed new low activity parameters.

20. The polled device of claim 19, further comprising instructions for causing the polled device to:
receive an updated low activity request message based on the proposed new low activity parameters from the polling device; and
transmit a new low activity response message accepting the updated low activity request message.

21. The apparatus polled device of claim 16, wherein the polling and polled devices implement a modified Low End Radio communication protocol.

22. A method, comprising:
transmitting polling messages to at least one polled device according to a general polling mode and a request to the at least one polled device to enter a low activity polling mode, wherein the low activity mode request includes a set of low activity polling mode parameters indicating a number of polling messages to which the polled device may refrain from responding;
receiving a response message from the at least one polled device; and
entering a low activity polling mode, wherein during the low activity polling mode the polled device refrains from accessing a data transfer channel for a time interval in accordance with the set of low activity polling mode parameters.

23. The method of claim 22, wherein the time interval is derived from a negotiation between the polling and polled devices.

24. The method of claim 22, wherein:
a periodicity of polling message transmissions in the low activity polling mode is specified in the transmitted low activity mode request.

25. The method of claim 22, wherein the general polling mode further comprises:
the periodicity associated with transmitting the polling messages is defined by a fixed time-interval, wherein said fixed time-interval commences following receipt of said response message.

26. The method of claim 22, wherein the general polling mode further comprises:
the periodicity associated with transmitting the polling messages is defined by a fixed time-interval, wherein said fixed time-interval commences at the end of a previous polling message, if no response message has been detected.

27. The method of claim 22, wherein:
the low activity mode is asymmetrical, whereby the at least one polled device abstains from responding to at least one of the polling messages; and
a number of polling messages to which the at least one polled device can abstain from responding to is specified in a parameter defined in the low activity mode request.

28. The method of claim 22, wherein:
the low activity mode is asymmetrical, whereby the polling device abstains from transmitting at least one of the polling messages; and
a number of polling messages to which the polling device can refrain from transmitting is specified in a parameter defined in the low activity mode request.

29. The method of claim 22, further comprising:
transmitting a message modifying the low activity time-interval after low activity data transfer has occurred.

30. The method of claim 22, further comprising:
conducting carrier sensing multiple access with collision avoidance for determining that there are no transmission conflicts prior to transmitting polling messages.

31. A communication device, comprising:
a memory configured to store instructions; and
a processor configured to process said instructions to cause the communication device to:
transmit polling messages to at least one polled device according to a general polling mode and transmit a low activity polling mode request to the at least one polled device, wherein the low activity polling mode request includes at least one of a number of polling messages to which the communication device will not respond and a number of polling messages that the communication device will refrain from transmitting during the low activity polling mode;
receive a response message from the at least one polled device, containing a response to the low activity polling mode request;
enter a low activity polling mode, wherein during the low activity polling mode the communication device refrains from accessing a data transfer channel for a time interval in accordance with an accepted set of low activity polling mode parameters.

32. The communication device of claim 31, wherein the time interval is derived from a negotiation between the communication device and polled device.

33. A computer program product comprising computer executable program code recorded on a computer readable storage medium, the computer executable program code comprising:
code configured to transmit polling messages to at least one polled device according to a general polling mode and transmit a low activity polling request to the at least one polled device, wherein the low activity polling mode request includes at least one of a number of polling messages to which the communication device will not respond and a number of polling messages that the communication device will refrain from transmitting during the low activity polling mode;

code configured to receive a response message from the at least one polled device, containing a response to the low activity polling mode request;

code configured to enter a low activity polling mode, wherein during the low activity polling mode the communication device refrains from accessing a data transfer channel for a time interval in accordance with an accepted set of low activity polling mode parameters.

34. The computer program product of claim 33, wherein the time interval is derived from a negotiation between the communication device and the polled device.

35. A computer program product comprising computer executable program code recorded on a computer readable storage medium, the computer executable program code comprising:

code configured to transmit a low activity request message including proposed low activity parameters from a polling device to a polled device, wherein the low activity parameters specify a number of polling messages the polling device may refrain from transmitting;

code configured to receive a low activity response message from the polled device; and code configured to enter a low activity mode based on the set of parameters included in the low activity request message, wherein the low activity mode reduces power consumption in the polling device.

36. A computer program product comprising computer executable program code recorded on a computer readable storage medium, the computer executable program code comprising:

code configured to transmit polling messages to at least one polled device according to a general polling mode and a request to the at least one polled device to enter a low activity polling mode, wherein the low activity mode request includes a set of low activity polling mode parameters indicating a number of polling messages to which the polled device may refrain from responding;

code configured to receive a response message from the at least one polled device; and code configured to enter a low activity polling mode, wherein during the low activity polling mode the polled device refrains from accessing a data transfer channel for a time interval in accordance with the set of low activity polling mode parameters.

37. An apparatus, comprising:

a processor, the processor being configured to:

transmit polling messages to at least one polled device according to a general polling mode and a request to the at least one polled device to enter a low activity polling mode, wherein the low activity mode request includes a set of low activity polling mode parameters indicating a number of polling messages to which the polled device may refrain from responding;

receive a response message from the at least one polled device; and enter a low activity polling mode, wherein during the low activity polling mode the polled device refrains from accessing a data transfer channel for a time interval in accordance with the set of low activity polling mode parameters.

38. A method, comprising:

transmitting a low activity polling mode request to a polled device, wherein the low activity polling mode request includes a set of low activity polling mode parameters indicating a number of polling messages to which the polled device may refrain from responding;

receiving a response message from the at least one polled device; and entering a low activity polling mode, wherein during the low activity polling mode the polled device refrains from accessing a data transfer channel for a time interval in accordance with the set of low activity polling mode parameters.

39. An apparatus, comprising:

at least one processor; and at least one memory including executable instructions, the at least one memory and the executable instructions being configured to, in cooperation with the at least one processor, cause the apparatus to perform at least the following:

transmit a low activity polling mode request to a polled device, wherein the low activity polling mode request includes a set of low activity polling mode parameters indicating a number of polling messages to which the polled device may refrain from responding;

receive a response message from the at least one polled device; and enter a low activity polling mode, wherein during the low activity polling mode the polled device refrains from accessing a data transfer channel for a time interval in accordance with the set of low activity polling mode parameters.

* * * * *